(12) United States Patent
Stahl et al.

(10) Patent No.: US 9,903,028 B2
(45) Date of Patent: Feb. 27, 2018

(54) NITROXYL-MEDIATED OXIDATION OF LIGNIN AND POLYCARBOXYLATED PRODUCTS

(71) Applicant: WISCONSIN ALUMNI RESEARCH FOUNDATION, Madison, WI (US)

(72) Inventors: Shannon S. Stahl, Madison, WI (US); Mohammad Rafiee, Madison, WI (US)

(73) Assignee: WISCONSIN ALUMNI RESEARCH FOUNDATION, Madison, WI (US)

( * ) Notice: Subject to any disclaimer, the term of this patent is extended or adjusted under 35 U.S.C. 154(b) by 0 days.

(21) Appl. No.: 15/167,053

(22) Filed: May 27, 2016

(65) Prior Publication Data

US 2017/0342574 A1    Nov. 30, 2017

(51) Int. Cl.
*C08H 7/00* (2011.01)
*C25B 3/00* (2006.01)
*C25B 3/02* (2006.01)

(52) U.S. Cl.
CPC ...... *C25B 3/02* (2013.01); *C08H 6/00* (2013.01)

(58) Field of Classification Search
CPC .................................. C25B 3/02; C08H 7/00
USPC .................. 205/455, 456, 463; 530/500, 507
See application file for complete search history.

(56) References Cited

U.S. PATENT DOCUMENTS

| | | | |
|---|---|---|---|
| 4,740,591 A | 4/1988 | Dilling et al. | |
| 4,786,382 A * | 11/1988 | Utley | C25B 3/02 205/689 |
| 5,889,054 A | 3/1999 | Yu et al. | |
| 6,261,544 B1 | 7/2001 | Coury et al. | |
| 8,969,534 B2 | 3/2015 | Stahl et al. | |
| 2013/0040031 A1 | 2/2013 | Stecker et al. | |

(Continued)

FOREIGN PATENT DOCUMENTS

EP    1 722 431 A2    11/2006
KR    10 2002 0095383    * 12/2002    ............ D21C 3/00

OTHER PUBLICATIONS

Rahimi et al., "Chemoselective Metal-Free Aerobic Alcohol Oxidation in Lignin," J. Am. Chem. Soc. (no month, 2013), vol. 135, pp. 6415-6418.*

(Continued)

*Primary Examiner* — Edna Wong
(74) *Attorney, Agent, or Firm* — Daniel A. Blasiole; DeWitt Ross & Stevens S.C.

(57) ABSTRACT

Methods of selectively modifying lignin, polycarboxylated products thereof, and methods of deriving aromatic compounds therefrom. The methods comprise electrochemically oxidizing lignin using stable nitroxyl radicals to selectively oxidize primary hydroxyls on β-O-4 phenylpropanoid units to corresponding carboxylic acids while leaving the secondary hydroxyls unchanged. The oxidation results in polycarboxylated lignin in the form of a polymeric β-hydroxy acid. The polymeric β-hydroxy acid has a high loading of carboxylic acid and can be isolated in acid form, deprotonated, and/or converted to a salt. The β-hydroxy acid, anion, or salt can also be subjected to acidolysis to generate various aromatic monomers or oligomers. The initial oxidation of lignin to the polycarboxylated form renders the lignin more susceptible to acidolysis and thereby enhances the yield of aromatic monomers and oligomers obtained through acidolysis.

14 Claims, 10 Drawing Sheets

(56) References Cited

U.S. PATENT DOCUMENTS

2013/0267483 A1 10/2013 Gupta

OTHER PUBLICATIONS

Rahimi et al., "Formic-Acid-Induced Depolymerization of Oxidized Lignin to Aromatics," Nature (Nov. 13, 2014), vol. 515, pp. 249-252.*
Xu et al., "Lignin Depolymerisation Strategies: Towards Valuable Chemicals and Fuels," Chem. Soc. Rev. (no month, 2014), vol. 43, pp. 7485-7500.*
Wikipedia, "Deprotonation", p. 1. Printed on Jul. 2, 2017.*
Basu Biomass Gasification, Pyrolysis and Torrefaction: Practical Design and Theory. (Table of Contents and Preface).
Boerjan et al., Lignin Biosynthesis. *Ann. Rev. Plant Biol.* 54, 519-549 (2003).
Bruijnincx et al., Biomass Conversion: Lignin up for break-down. *Nat. Chem.* 6, 1035-1036 (2014).
Bugg et al., Pathways for degradation of lignin in bacteria and fungi. *Nat. Prod. Rep.* 28, 1883-1896 (2011).
Constant et al., Vanillin oligomerization as a model of side reactions in lignin fragmentation. *Catal. Today*, 189, 123-128 (2012).
Costentin et al., Turnover Numbers, Turnover Frequencies, and Overpotential in Molecular Catalysis of Electrochemical Reactions. Cyclic Voltammetry and Preparative-Scale Electrolysis. *J. Am. Chem. Soc.* 134, 11235-11242 (2012).
Ganguly et al. Hydrolysis and retro-aldol cleavage of ethylthreo-2-(1-adamantyl)-3-hydroxybutyrate: competing reactions. *J. Phys. Org. Chem.* 24 578-587 (2011).
Hibino et al., Chemical properties of lignin from Aralia cordata. *Phytochemistry*, 1994, 37, 445-448.
Izutso et al., Electrochemistry in nonaqueous solutions, Chapter 1.
Jayant et al., *Handbook of Polyelectrolytes and Their Applications*; Sukant, T. Ed.; American Scientific Publishers, 2002.
Konduri et al., Production of Water-soluble Hardwood Kraft Lignin via Sulfomethylation Using Formadehyde and Sodium Sulfite, *ACS Sustainable Chem. Eng.* 2015, 3, 1172-1182.
Laurichesse et al., Chemical modification of lignins: Towards biobased polymers, *Prog. Polym. Sci.*, 2014, 7, 1266-1290.
Lebo et al., "Lignin" in *Kirk-Othmer Encyclopedia of Chemical Technology*. John Wiley & Sons, Inc. 2001.
Li et aL, Catalytic transformation of lignin for the production of chemicals and fuels. *Chem. Rev.* 115, 11559-11624 (2015).
Liu et al., Preparation and Characterization of Demethylated Lignin-Polyethylenimine Adhesives, *J. Adhes.* 2006, 82, 593-605.
Mark, J. E. Polymer Data Handbook; *Oxford University Press*, 2009; 252-253.
Nicholson et al., Theory of Stationary Electrode Polarography. Single Scan and Cyclic Methods Applied to Reversible, Irreversible, and Kinetic Systems. *Anal. Chem.*, 36, 706-723 (1964).

Parpot et al., Biomass conversion: attempted electrooxidation of lignin for vanillin production. *J. Appl. Electrochem.* 30, 727-731(2000).
Rafiee et al., Study of the Electrocatalytic Oxidation of Alcohols by TEMPO and NHPI. *ChemElectroChem*, 1, 455-462 (2014).
Rafiee et al., Electrocatalytic Alcohol Oxidation with TEMPO and Bicyclic Nitroxyl Derivatives: Driving Force Trumps Steric Effects, *J. Am. Chem. Soc.* 137, 14751-14757, (2015).
Rahimi et al., Chemoselective Metal-Free Aerobic Alcohol Oxidation in Lignin. *J. Am. Chem. Soc.* 135, 6415-6418 (2013).
Rahimi et al., Formic-acid-induced depolymerization of oxidized lignin to aromatics. *Nature* 515, 249-252 (2014).
Roberts et al., Influence of alkali carbonates on benzyl phenyl cleavage pathways in superheated water, *A. Appl. Catal. B* 2010, 95, 71-77.
Rondestvedt et al., The Base-catalyzed Cleavage of β-Hydroxy Acids. *J. Am. Chem. Soc.*, 78, 3804-3811 (1956).
Schmitt et al., Highly selective generation of vanillin by anodic degradation of lignin: a combined approach of electrochemistry and product isolation by adsorption. *Beilstein J. Org. Chem.* 11, 473-480 (2015).
Séon et al., Polyelectrolyte Multilayers: A Versatile Tool for Preparing Antimicrobial Coatings. *Langmuir*, 2015, 31 (47), pp. 12856-12872.
Sheldon et al., Organocatalytic Oxidations Mediated by Nitroxyl Radicals. *Advanced Synthesis & Catalysis. Special Issue: Organic Catalysis*. vol. 346, Issue 9-10, pp. 1051-1071, Aug. 2004.
Shiraishi et al., Studies on electro-oxidation of lignin and lignin model compounds. Part 2: N-Hydroxyphthalimide (NHPI)-mediated indirect electro-oxidation of non-phenolic lignin model compounds, *Holzforschung*, vol. 66, pp. 311-315, 2012 (PDF Download Available). Available from: https://www.researchgate.net/publication/235224749_Studies_on_electro-oxidation_of_lignin_and_lignin_model_compounds_Part_2_N-Hydroxyphthalimide_NHPI-mediated_indirect_electro-oxidation_of_non-phenolic_lignin_model_compounds [accessed May 5, 2016].
Ten et al., Recent developments in polymers derived from industrial lignin, *J. Appl. Polym. Sci.* 2015, 132, 42069-42082.
Tuck et al., Valorization of biomass: deriving, more value from waste. *Science* 337, 695-699 (2012).
Upton et al., Strategies for the conversion of Lignin to High-Value Polymeric Materials: Review and Persspective, *Chem. Rev.* 2016, ASAP article.
Wang et al., Fabrication, Property, and application of Lignin-Based Nanocomposites, *Eco-friendly Polymer Nanocomposites Chemistry and Applications*; Thakur, V. K.; Thakur, M. K., Ed.; Springer, New Delhi, 2015.
Zakeski et al., The catalytic valorization of lignin for the production of renewable chemicals. *Chem. Rev.* 110, 3552-3599 (2010).

* cited by examiner

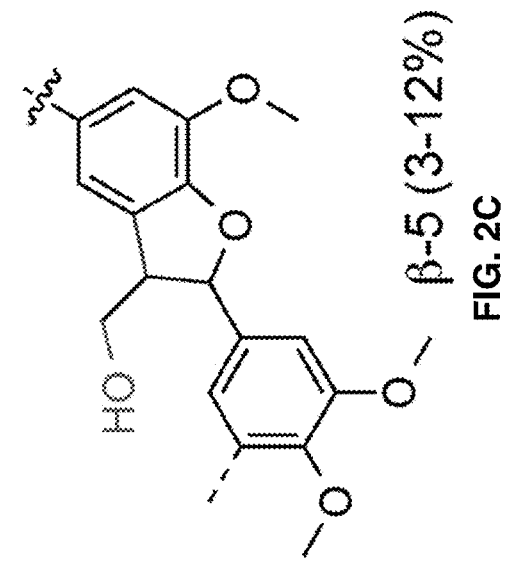
FIG. 2A β-O-4 (45-62%)
FIG. 2B β-1 (2-9%)
FIG. 2C β-5 (3-12%)
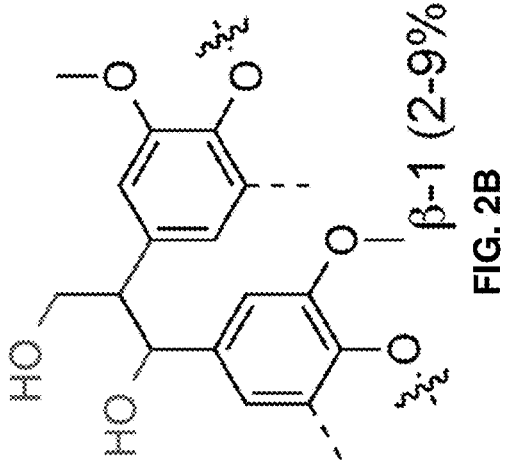
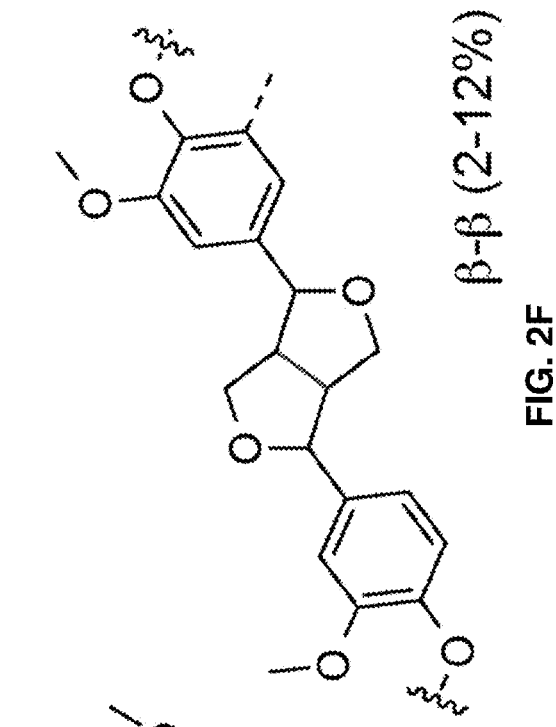
FIG. 2F β-β (2-12%)
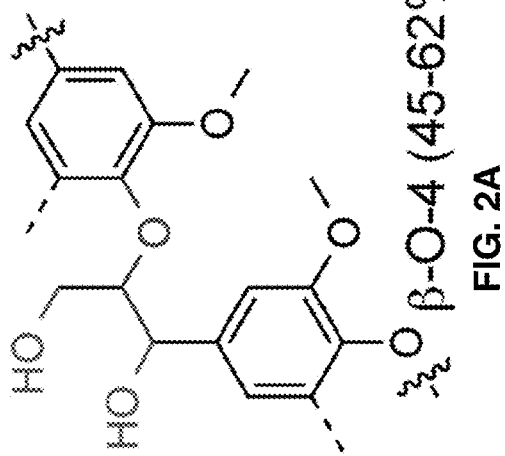
FIG. 2D 4-O-5 (4-10%)
FIG. 2E 5-5 (3-27%)

NITROXYL-MEDIATED OXIDATION OF LIGNIN AND POLYCARBOXYLATED PRODUCTS

STATEMENT REGARDING FEDERALLY SPONSORED RESEARCH

This invention was made with government support under DE-FC02-07ER64494 awarded by the US Department of Energy. The government has certain rights in the invention.

FIELD OF THE INVENTION

The invention relates to nitroxyl-mediated electrocatalytic oxidation of lignin and products obtained therefrom.

BACKGROUND

Lignin is a three-dimensional macromolecule that occurs in the cell wall of plants and is composed of various phenolic monomer building blocks such as p-coumaryl alcohol, coniferyl alcohol, and sinapyl alcohol. Lignin is incorporated into the plant cell wall during the growth of plants. About 20% to 30% of the dry matter of lignified plants comprises lignin. In addition to cellulose and chitin, lignin is one of the most abundant organic compounds on Earth.

Lignin and lignin-containing substances such as alkali lignin, lignin sulfate, or lignosulfonate occur in large amounts as byproducts in various industrial processes such as paper manufacture. The total production of lignin-containing substances is estimated at about 20 billion tons per year. Lignin is therefore a very valuable raw material. Some of this lignin is used in a number of applications. For example, alkali lignin, which can be produced by alkali treatment of the black liquor arising in paper manufacture, is used in North America as a binder for particle boards based on wood and cellulose, as a dispersant, as an agent for clarification of sugar solutions, and as a stabilizer for asphalt emulsions and foam. The greatest amount of lignin is used to produce energy through combustion.

Because lignin is rich in aromatics, lignin can potentially serve as a source for a number of valuable aromatic polymers, oligomers, and monomers. However, lignin is notoriously difficult to selectively modify or break down in to simpler compounds. Progress in selectively modifying and breaking down lignin into simpler compounds has been made (see U.S. Pat. No. 8,969,534), but further progress on this front is needed.

SUMMARY OF THE INVENTION

The invention is directed to methods of selectively modifying lignin, polycarboxylated products thereof, and methods of deriving aromatic compounds therefrom. The invention provides methods of electrochemically oxidizing lignin using stable nitroxyl radicals as an electrocatalytic mediator. The electrochemical oxidation oxidizes primary hydroxyls on lignin to corresponding carboxylic acids. In particular, the electrochemical oxidation selectively oxidizes primary hydroxyls on β-O-4 phenylpropanoid units in the lignin to corresponding carboxylic acids while leaving the secondary hydroxyls unchanged. The oxidation results in polycarboxylated lignin in the form of a polymeric β-hydroxy acid. The polymeric β-hydroxy acid can be isolated in acid form for use as a polyacid. Alternatively, the polymeric β-hydroxy acid can be deprotonated for use as a polyanion or converted to a salt for use as a polyelectrolyte. The β-hydroxy acid, anion, or salt can also be subjected to acidolysis to generate various aromatic monomers or oligomers. The initial oxidation of lignin to the polycarboxylated form renders the lignin more susceptible to acidolysis and thereby enhances the yield of aromatic monomers and oligomers obtained through acidolysis.

An aspect of the invention is a method of oxidizing lignin. The method comprises electrochemically oxidizing lignin in an oxidation process in the presence of a stable nitroxyl radical to form oxidized lignin. The oxidation process is performed at a pH that allows oxidation of primary hydroxyls on at least a portion of β-O-4 phenylpropanoid units comprising both primary and secondary hydroxyls to corresponding carboxylic acids while leaving the secondary hydroxyls on the portion of the β-O-4 phenylpropanoid units unchanged.

The oxidation process in some versions is conducted at a pH of from about 7 to about 11.

The oxidation process in some versions is conducted in a solvent comprising at least about 45% water by volume.

The oxidation process in some versions forms oxidized β-O-4 phenylpropanoid units in the oxidized lignin from corresponding unoxidized β-O-4 phenylpropanoid units in the lignin, wherein at least about 60% of the oxidized β-O-4 phenylpropanoid units comprise a carboxylic acid oxidized from a primary hydroxyl in the corresponding unoxidized β-O-4 phenylpropanoid unit and a secondary hydroxyl on the oxidized β-O-4 phenylpropanoid unit that is unchanged from the unoxidized β-O-4 phenylpropanoid unit.

The oxidation process in some versions forms oxidized β-O-4 phenylpropanoid units in the oxidized lignin from corresponding unoxidized β-O-4 phenylpropanoid units in the lignin, wherein at least about 50% of the oxidized β-O-4 phenylpropanoid units comprise a secondary hydroxyl that remains unchanged from the unoxidized β-O-4 phenylpropanoid unit.

The oxidation process in some versions forms oxidized β-O-4 phenylpropanoid units in the oxidized lignin from corresponding unoxidized β-O-4 phenylpropanoid units in the lignin, wherein at least about 60% of the oxidized β-O-4 phenylpropanoid units remain uncleaved.

The oxidation process in some versions yields oxidized lignin comprising from about 0.2 to about 0.8 carboxylic acid or carboxylate functional groups per ppu.

In some versions, the lignin used in the oxidation process comprises a total phenolic hydroxy content of less than 2.5 mmol/g.

In some versions, the method further comprises deprotonating the oxidized lignin.

In some versions, the method yields polycarboxylated lignin and further comprises isolating the polycarboxylated lignin from non-polycarboxylated components of the oxidized lignin.

In some versions, the method yields oxidized lignin has an average molecular weight of from about 240 Da to about 100,000 Da.

In some versions, the method further comprises separating oxidized lignin species less than about 240 Da from oxidized lignin species greater than about 240 Da.

In some versions, the method further comprises digesting the oxidized lignin with acid. In some versions, the method further comprises isolating products having a size less than about 240 Da from the acid-digested, oxidized lignin.

Another aspect of the invention is an oxidized lignin or acid-digested product thereof. The oxidized lignin or acid-digested product thereof can be made using any of the methods described above or elsewhere herein.

Another aspect of the invention is a polycarboxylated compound. The polycarboxylated compound may be a polymeric β-hydroxy acid, anion, or salt. The polycarboxylated compound comprises linked β-O-4 phenylpropanoid units, wherein at least a portion of the β-O-4 phenylpropanoid units each comprise a secondary hydroxyl moiety and a carboxylic acid or carboxylate moiety.

In some versions, a majority of the β-O-4 phenylpropanoid units in the portion of the polycarboxylated compound comprise a carboxylate moiety.

In some versions, the polycarboxylated compound is in a deprotonated form.

In some versions, the polycarboxylated compound is in salt form.

In some versions, the β-O-4 phenylpropanoid units in the portion of the polycarboxylated compound are substantially devoid of phenolic hydroxyl groups.

In some versions, the polycarboxylated compound has a solubility in water of at least about 5 g/L at about pH 9 and about 23° C.

In some versions, the polycarboxylated compound comprises from about 0.2 to about 0.8 carboxylic acid or carboxylate functional groups per ppu.

In some versions, the polycarboxylated compound comprises a molecular weight between about 700 Da and about 100,000 Da.

In some versions, the polycarboxylated compound is in a purified form.

In some versions, at least about 60% of the β-O-4 phenylpropanoid units comprising a carboxylic acid or carboxylate moiety in the polycarboxylated compound also comprise a secondary hydroxyl moiety.

In some versions, the polycarboxylated compound further comprises linked β-5 phenylpropanoid units, wherein at least a portion of the β-5 phenylpropanoid units each comprise a carboxylic acid or carboxylate moiety.

The objects and advantages of the invention will appear more fully from the following detailed description of the preferred embodiment of the invention made in conjunction with the accompanying drawings.

BRIEF DESCRIPTION OF THE DRAWINGS

FIGS. 2A-2F show exemplary types of linkages in lignin and an estimated abundance of each type. FIG. 2A shows a β-O-4 linkage. FIG. 2B shows a β-1 linkage. FIG. 2C shows a β-5 linkage. FIG. 2D shows a 4-O-5 linkage. FIG. 2E shows a 5-5 linkage. FIG. 2F shows a β-β linkage.

DETAILED DESCRIPTION OF THE INVENTION

Figure 1:
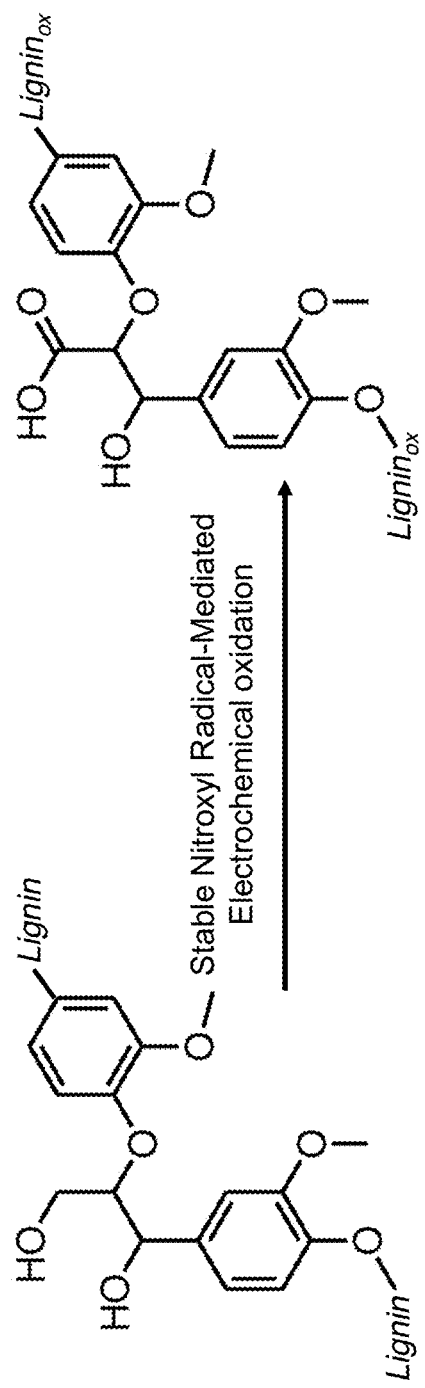
FIG. 1 shows an exemplary stable nitroxyl radical-mediated electrochemical oxidation reaction of the present invention on an exemplary β-O-4 phenylpropanoid unit in lignin, wherein the primary hydroxyl on the β-O-4 phenylpropanoid unit is selectively oxidized to its corresponding carboxylic acid.

The invention provides methods of electrochemically oxidizing lignin in the presence of a stable nitroxyl radical to form oxidized lignin. The methods are capable of selectively oxidizing primary hydroxyls on β-O-4 phenylpropanoid units comprising both primary and secondary hydroxyls, such that the primary hydroxyls are oxidized to corresponding carboxylic acids while the secondary hydroxyls remain unchanged. See FIG. 1 for an exemplary stable nitroxyl radical-mediated electrochemical oxidation reaction of the present invention on an exemplary β-O-4 phenylpropanoid unit in lignin, wherein the primary alcohol on the β-O-4 phenylpropanoid unit is selectively oxidized to its corresponding carboxylic acid.

As used herein, "β-O-4 phenylpropanoid unit" refers to a phenylpropanoid unit linked to another phenylpropanoid unit via a β-O-4 linkage. Phenylpropanoid units are also referred to as "phenylpropane units," "lignin monomer units," or variants thereof. Phenylpropanoid units are typically derived from various lignin monomers, such as p-coumaryl alcohol, coniferyl alcohol, and sinapyl alcohol, among others. Phenylpropanoid units generally comprise a substituted or unsubstituted phenyl moiety attached to a substituted or unsubstituted propyl or propenyl moiety. The substitutions may comprise hydroxy groups and alkoxy (e.g., methoxy) groups, among others. The phenyl moiety or the propyl or propenyl moiety may be linked to the phenyl moiety and/or the propyl or propenyl moiety of other phenylpropanoid units by a variety of linkages, as shown in FIGS. 2A-2F.

An exemplary β-O-4 phenylpropanoid unit linked to the phenyl moiety of another phenylpropanoid unit via a β-O-4 linkage is shown in FIG. 2A. The depicted β-O-4 phenylpropanoid unit is not meant to be limiting, as the β-O-4 phenylpropanoid units may comprise or be devoid of methoxy moieties on various other positions of the phenyl moieties and may be linked to the remaining lignin at a variety of other sites. Various methoxy configurations include p-hydroxyphenyl (no methoxy substituents on the phenyl ring), guaiacyl (methoxy substituents on the 3 position of the phenyl ring), and syringyl (methoxy substituents on the 3 and 5 positions of the phenyl ring) configurations. Other exemplary types of linkages are shown in FIGS.

Figure 3:
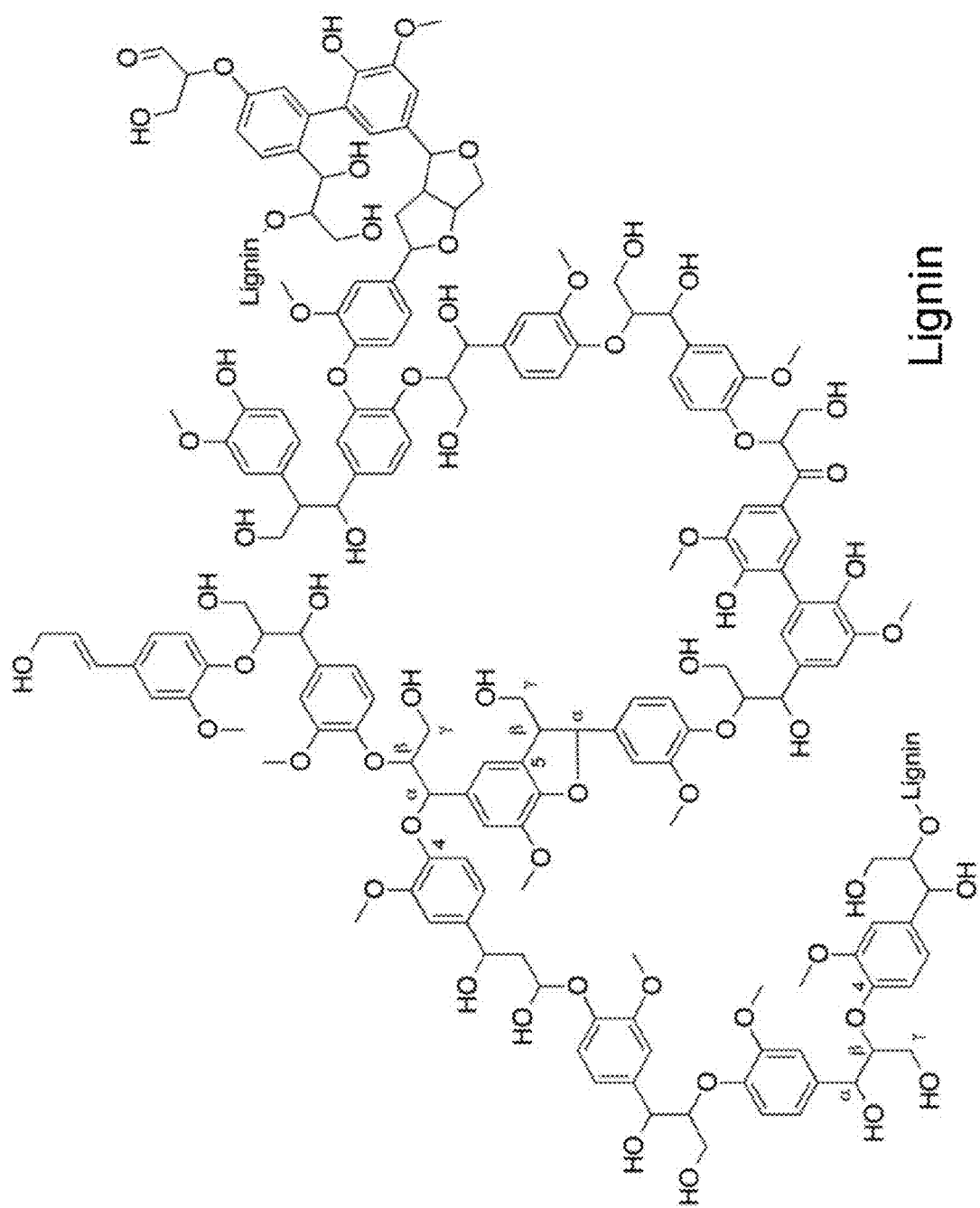
FIG. 3 shows an exemplary lignin structure with various linkages.

2B-2F, and an exemplary structure of lignin showing at least some of these linkages is shown in FIG. 3.

The electrochemical oxidation reaction may be conducted in an electrochemical cell. The electrochemical cell configuration can be a three- or two-electrode configuration. For the two-electrode configuration, the electrochemical cell has two conductive electrodes: an anode and a cathode. For the three-electrode configuration, the electrochemical cell has an anode, a cathode, and a reference or quasi-reference electrode in which the potential of either the anode or the cathode can be adjusted or monitored versus the reference electrode. The reference electrode can is an electrode which has a stable and known electrode potential. Examples of reference electrodes include reversible hydrogen electrodes, saturated calomel electrodes, and silver-silver chloride electrodes. The quasi-reference electrode includes a piece of metal wire, for example silver or platinum, in electrical contact with solution mixture. The anode and cathode electrodes can be made from any sufficiently conductive materials, such as metals, metal oxides, semiconductors, graphite glassy carbon or any other conductive carbon based material, and even conductive polymers.

Exemplary materials for the anode include graphite, glassy carbon, silver, copper, nickel, iron, stainless steel, or any conductive or semiconductive mixtures or alloys thereof. The anode may be in the form of expanded metals, grids or metal sheets. The anode may be a supported or coated conductive material on the surface of any solid material. Suitable support materials include any conductive or even nonconductive solid material in different shapes and configurations such as plates, sheets, and/or grids.

Exemplary materials for the cathode include silver, nickel, silver-comprising alloys, RuOxTiOx mixed oxide, platinated titanium, platinum, stainless steel, graphite, carbon, or mixtures thereof. The cathode may also be a supported or coated conductive material on the surface of any solid material. Suitable support materials for the cathode are the same as those described above for the anode. Supports in the form of expanded solid material, grids, or metal sheets may be used.

The arrangement of anode and cathode is not restricted and comprises, for example, arrangements of planar meshes and/or plates which can also be arranged in the form of a plurality of stacks of alternating poles, and cylindrical arrangements of cylindrically shaped nets, grids or tubes, which can also be arranged in the shape of a plurality of cylinders of alternating poles.

For achieving optimum space-time yields, various electrode geometries are known to those skilled in the art. Those which are advantageous are a bipolar arrangement of a plurality of electrodes, an arrangement in which a rod-shaped anode is encompassed by a cylindrical cathode, or an arrangement in which not only the cathode but also the anode comprises a wire net and these wire nets were placed one on top of the other and rolled up cylindrically.

The anode and cathode may be separated from one another by a separator. The separator is typically a porous planar material arranged between the electrodes, e.g. a grid, net, woven fabric or nonwoven, made of a non-electrically conducting material which is inert under the oxidation conditions, e.g. a plastics material, in particular a Teflon material or a Teflon-coated plastics material.

Any electrolytic cell format known to those skilled in the art can be used. Exemplary formats include divided or undivided continuous-flow cells, capillary gap cells, or stacked-plate cells.

The contents of the electrolysis cell may be mixed. Any mechanical agitator known to those skilled in the art can be used for mixing. The use of other mixing methods, such as Ultraturrax, ultrasound, or jet nozzles may also be used.

The oxidation may be carried out under controlled current or controlled potential conditions using either two- or three-electrode configurations. For controlled potential electrolysis using a three-electrodes configuration, the applied voltage at the anode is preferably adjusted within a range equivalent to a range of from about 0.1 to about 2 V versus the reference electrode, for example Ag/AgCl, such as about 0.1 to about 1.9 V versus the reference electrode, or about 0.3 to about 0.9 V versus Ag/AgCl. The applied potentials to the working electrode can vary depending on the redox potential of the mediator. The working potentials can vary, for example, from about 0.2 V less to about 2 volts more than the redox potential of the mediator that will be measured versus any reference electrode under experimental electrochemical conditions. Voltages above and below these exemplary voltages may be acceptable. However, voltages less than an equivalent of about 2 V versus the reference electrode, such as less than about 1.8, less than about 1.7, less than about 1.6, less than about 1.5, less than about 1.4, less than about 1.3, less than about 1.2, less than about 1.1, or less than about 1.0 V versus the reference electrode are preferred.

For controlled potential electrolysis using a two-electrode configuration, the applied voltage to the working electrode, and consequently the electrolysis cell, may vary depending on the reaction conditions and reactions that happen at the anode and cathode. In this case, an exemplary applied potential to the electrochemical cell may be of from about 1 to 5 V. Considering the size of the electrochemical cell and its resistance, the overall cell potential can reach up to 20 V or even more.

For controlled current electrolysis reactions, either two-electrode or three-electrode configurations can be used. The electrolysis reaction can be performed at wide range of currents, and the cell potential varies as a function of adjusted current. Higher cell currents will lead to higher cell voltages. The amount of current is also directly proportional to the utilized electrode surface and the size of electrochemical cell. The oxidation may be carried out at a current range from about 1 milliampere to about 100 amperes. Values above and below these exemplary currents are acceptable.

The total time of oxidation depends on the electrolysis cell, the electrodes used, and the current density. An optimum time can be determined by a person skilled in the art by routine experiments, e.g. by sampling during the oxidation.

The oxidation may be carried out at a temperature in a range from about 0° C. to about 100° C., such as about 5° C. to about 55° C., about 10° C. to about 40° C., about 15° C. to about 35° C., or about room temperature. Temperatures above and below these exemplary temperatures are acceptable.

The oxidation may be carried out at a pressure below 2000 kPa, preferably below 1000 kPa, in particular below 150 kPa, e.g. in a range of from about 50 to about 1000 kPa, such as from about 80 to about 150 kPa or about 101±20 kPa (about atmospheric pressure). Pressures above and below these exemplary values are acceptable.

The oxidation may be carried out in a lignin-comprising suspension or solution. The lignin-comprising suspension or solution generally comprises from about 0.5% to about 30% by weight, preferably about 1% to about 15% by weight, in particular about 1% to about 10% by weight lignin, based on the total weight of the lignin-comprising suspension or solution.

In all processes of the manufacture of paper, pulp, or cellulose, lignin-comprising wastewater streams occur. These can be used as the lignin-comprising suspension or solution in the method according to the invention. In the organocell process, the lignin occurs as organosolv lignin. Organosolv lignin-comprising wastewater streams can also be used as the lignin-comprising suspension or solution in the method according to the invention.

The lignin-comprising suspensions or solutions can also be produced by dissolution or suspension of at least one lignin-comprising material. The lignin-comprising material may comprise at least about 10% by weight, such as at least about 15% by weight or at least 20% by weight lignin, based on the total weight of the lignin-comprising material. Exemplary lignin-containing materials include lignin isolates.

The lignin used in the methods of the invention may have a particular range of phenolic hydroxy content depending on the desired outcome. It was unexpectedly found that β-O-4 phenylpropanoid units comprising phenolic p-hydroxy moieties (i.e., a hydroxy group on the 4 position of the phenyl ring, regardless of any other substituents elsewhere on the ring) promote cleavage of the β-O-4 phenylpropanoid units rather than selective oxidation of the primary hydroxyl to its corresponding carboxylic acid. See, e.g., Entry 8 of Table 1 in the following examples. Thus, for versions of the invention in which selective oxidation of the primary hydroxyl to its corresponding carboxylic acid in β-O-4 phenylpropanoid units is desired, lignin having a low phenolic p-hydroxy content is preferred. The lignin in such versions preferably has a phenolic p-hydroxy content less than about 2 mmol/g, less than about 1.8 mmol/g, less than about 1.6 mmol/g, less than about 1.4 mmol/g, less than about 1.2 mmol/g, less than about 1 mmol/g, less than about 0.95 mmol/g, less than about 0.9 mmol/g, less than about 0.85 mmol/g, less than about 0.8 mmol/g, less than about 0.75 mmol/g, less than about 0.7 mmol/g, less than about 0.75 mmol/g, less than about 0.70 mmol/g, less than about 0.65 mmol/g, less than about 0.60 mmol/g, less than about 0.55 mmol/g, less than about 0.5 mmol/g, less than about 0.45 mmol/g, less than about 0.4 mmol/g, less than about 0.35 mmol/g, less than about 0.3 mmol/g, less than about 0.25 mmol/g, less than about 0.20 mmol/g, less than about 0.15 mmol/g, or less than about 0.1 mmol/g.

Other phenolic hydroxyl groups are predicted to have a similar effect. Thus, some versions of the invention have a total phenolic hydroxy content (i.e., hydroxy group(s) at any one or more of the positions of the phenyl ring, regardless of any other substituents elsewhere on the ring) less than about 3 mmol/g, less than about 2.8 mmol/g, less than about 2.6 mmol/g, less than about 2.4 mmol/g, less than about 2.2 mmol/g, less than about 2 mmol/g, less than about 1.8 mmol/g, less than about 1.6 mmol/g, less than about 1.4 mmol/g, less than about 1.2 mmol/g, less than about 1 mmol/g, less than about 0.95 mmol/g, less than about 0.9 mmol/g, less than about 0.85 mmol/g, less than about 0.8 mmol/g, less than about 0.75 mmol/g, less than about 0.7 mmol/g, less than about 0.75 mmol/g, less than about 0.70 mmol/g, less than about 0.65 mmol/g, less than about 0.60 mmol/g, less than about 0.55 mmol/g, less than about 0.5 mmol/g, less than about 0.45 mmol/g, less than about 0.4 mmol/g, less than about 0.35 mmol/g, less than about 0.3 mmol/g, less than about 0.25 mmol/g, less than about 0.20 mmol/g, less than about 0.15 mmol/g, or less than about 0.1 mmol/g.

The phenolic content of lignin from various sources is well known in the art. Exemplary types of lignin having a relatively low phenolic content include softwood and hardwood (such as aspen and poplar) lignin. Exemplary types of lignin having a relatively high phenolic content include corn and straw (wheat) lignin.

For improvement of the solubility of the lignin during oxidation, particularly in an aqueous solvent, it can be advantageous to dissolve or suspend the lignin together with inorganic bases. Inorganic bases which can be used are alkali metal hydroxides such as NaOH or KOH, ammonium salts such as ammonium hydroxide, and alkali metal carbonates such as sodium carbonate, e.g., in the form of soda. Preference is given to alkali metal hydroxides, in particular NaOH and KOH. The concentration of inorganic bases is preferably in a range of from about 0.01 to about 5 mol/l, such as from about 0.1 to about 4 mol/l.

The pH under which the electrochemical oxidation is conducted depends on whether or not cleavage of β-O-4 phenylpropanoid units is intended to be prevented. As shown in the examples, high pHs promote cleavage of cleavage of β-O-4 phenylpropanoid units. At low pHs, oxidation will not occur efficiently or at all due to the inability of the mediator to regenerate. Thus, in versions in which cleavage of β-O-4 phenylpropanoid units is intended to be prevented, the oxidation is preferably carried out at a pH of at least about 5, about 6, or about 7 and no more than about 12, about 11, about 10, about 9, or about 8. A pH range of about 5 to about 11, such as from about 7 to about 11 or about 7 to about 10, is preferred for selectively oxidizing primary hydroxyls on the β-O-4 phenylpropanoid units to corresponding carboxylic acids while avoiding cleavage of the β-O-4 phenylpropanoid units. In versions in which cleavage of β-O-4 phenylpropanoid units is not intended to be prevented, the oxidation is preferably carried out at a pH of from about 5 to about 14, such as from about 5 to about 13 or about 5 to about 12.

The oxidation is preferably carried out in the presence of a base. Non-limiting exemplary bases include $NaHCO_3$, $Na_2CO_3$, $Na_3PO_4$, 2,6-lutidine, and combinations thereof.

The oxidation is preferably performed in the presence of a conducting salt (electrolyte) to improve conductivity. Exemplary conducting salts include alkali metal salts, such as salts of Li, Na, K or quaternary ammonium salts such as tetra($C_1$-$C_6$ alkyl)ammonium or tri($C_1$-$C_6$ alkyl)methylammonium salts. Exemplary counter ions include sulfate, hydrogensulfate, alkylsulfates, arylsulfates, halides, phosphates, carbonates, bicarbonate, perchlorate, alkylphosphates, alkylcarbonates, nitrate, alcoholates, tetrafluoroborate, hexafluorophosphate, perchlorate, $C_1$-$C_6$ alkylsulfonates, arylsulfonates, triflate, or bistriflimide. In addition, as conducting salts, ionic liquids are also suitable. Suitable electrochemically stable ionic liquids are described in "Ionic Liquids in Synthesis", editors: Peter Wasserscheid, Tom Welton, Verlag Wiley-VCH 2003, chapters 1 to 3.

The oxidation is preferably carried out in the presence of a mediator. Mediators are redox pairs which make possible an indirect electrochemical oxidation. The mediator is converted electrochemically to the higher oxidation state, and then acts as an oxidizing agent and is regenerated thereafter by electrochemical oxidation. This is therefore an indirect electrochemical oxidation of the organic compound, since the mediator is the oxidizing agent.

Preferred mediators are stable nitroxyl radicals. Stable nitroxyl radicals are distinguished from nitroxyls that form radicals in situ, such as N-hydroxyphthalimide (NHPI) and other diacylnitroxyls derived from N-hydroxy imides. See Sheldon et al. 2004. Unlike stable nitroxyl radicals, diacyl-nitroxyls such as NHPI have been shown to promote selective oxidation of secondary hydroxyl groups rather than primary hydroxyl groups on β-O-4 phenylpropanoid units. See Shiraishi et al. 2012. Stable nitroxyl radicals, by contrast, promote selective oxidation of primary hydroxyl groups on β-O-4 phenylpropanoid units.

Exemplary nitroxyl radicals are represented by the following formulas:

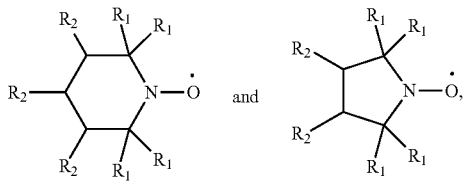

wherein:
each $R_1$ is independently selected from -alkyl; and
each $R_2$ is independently selected from —H, —OH, —$NH_2$, —N(CO)-alkyl, —N(CO)-aryl, —O(CO)-alkyl, —O(CO)-aryl, —(CO)-alkyl, —(CO)-aryl, —(CO)O-alkyl, —(CO)O-aryl, —O-alkyl, and —O-aryl;

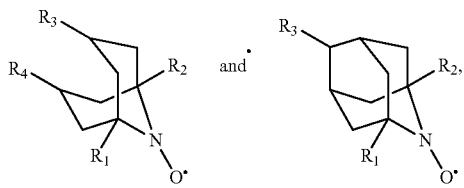

wherein:
each $R_1$ and $R_2$ is independently selected from —H and -alkyl; and
each $R_3$ and $R_4$ is independently selected from —H, —OH, —$NH_2$, —N(CO)-alkyl, —N(CO)-aryl, —O(CO)-alkyl, —O(CO)-aryl, —(CO)-alkyl, —(CO)-aryl, —(CO)O-alkyl, (CO)O-aryl, —O-alkyl, and —O-aryl;

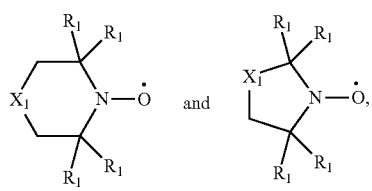

wherein:
each $R_1$ is independently selected from -alkyl; and
each $X_1$ is independently selected from —O, —S, and —CO;

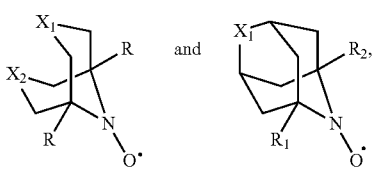

wherein:
each R, $R_1$, and $R_2$ is independently selected from —H and -alkyl; and
each $X_1$ and $X_2$ is independently selected from —O, —S, and —CO;

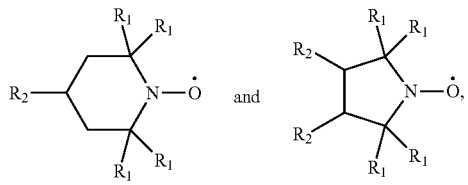

wherein:
each $R_1$ is independently selected from -alkyl; and
each $R_2$ is independently selected from —H, —OH, —$NH_2$, —N(CO)-alkyl, —N(CO)-aryl, —O(CO)-alkyl, —O(CO)-aryl, —(CO)-alkyl, —(CO)-aryl, —(CO)O-alkyl, —(CO)O-aryl, —O-alkyl, and —O-aryl; and

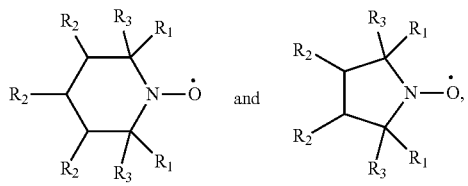

wherein:
each $R_1$ is independently selected from -alkyl;
each $R_2$ is independently selected from —H, —OH, —$NH_2$, —N(CO)-alkyl, —N(CO)-aryl, —O(CO)-alkyl, —O(CO)-aryl, —(CO)-alkyl, —(CO)-aryl, —(CO)O-alkyl, —(CO)O-aryl, —O-alkyl, and —O-aryl; and
each $R_3$ is independently selected from —N(CO)-alkyl, —N(CO)-aryl, —O(CO)-alkyl, —O(CO)-aryl, —(CO)-alkyl, —(CO)-aryl, —(CO)O-alkyl, —(CO)O-aryl, —O— alkyl, and —O-aryl.

Specific exemplary nitroxyl radicals comprise 2-azaadamantane N-oxyl (AZADO), 9-azabicyclo[3.3.1]nonane Noxyl (ABNO), keto-ABNO, 2,2,6,6-tetramethyl-1-piperidine N-oxyl (TEMPO), 4-acetamido-TEMPO (ACT), and 4-oxo-TEMPO.

The oxidation of the lignin is preferably conducted in a solvent. The solvent is preferably an aqueous solvent. The solvent preferably comprises at least about 10%, at least about 20%, at least about 30%, at least about 40%, at least about 50%, at least about 60%, at least about 70%, at least about 80%, at least about 90%, at least about 95%, or about 100% water by volume. The solvent may alternatively or additionally comprise an organic solvent. The organic solvent is preferably an inert organic solvent. The organic solvent is preferably a polar-aprotic solvent having a high electrochemical stability. Exemplary polar-aprotic solvents having a high electrochemical stability include acetonitrile, propionitrile, adiponitrile, suberodinitrile, propylene carbonate, ethylene carbonate, dichloromethane, nitromethane, chloroform, carbon tetrachloride, 1,2-dichloroethane, 1,1,2,2-tetrachloroethane, trichloroethylene, tetrachloroethylene, hexafluoroacetone, N-methylpyrrolidone, hexamethylphosphoric triamide, dimethyl sulfoxide and dimethyipropyleneurea (DMPU). Further suitable polar-aprotic solvents are described in Kosuke Izutsu, "Electrochemistry in Nonaqueous Solutions", Verlag Wiley-VCH 2002, chapter 1.

The oxidation methods described herein are capable of selectively oxidizing primary hydroxyls on at least a portion of β-O-4 phenylpropanoid units comprising both primary and secondary hydroxyls in the lignin to corresponding carboxylic acids while leaving the secondary hydroxyls on the portion of the β-O-4 phenylpropanoid units unchanged and without cleaving the β-O-4 phenylpropanoid units. Accordingly, various versions of the invention are capable of generating oxidized β-O-4 phenylpropanoid units in the oxidized lignin from corresponding unoxidized β-O-4 phenylpropanoid units in the lignin wherein at least about 10%, at least about 20%, at least about 30%, at least about 40%, at least about 50%, at least about 60%, at least about 70%, at least about 80%, at least about 90%, or more of the oxidized β-O-4 phenylpropanoid units comprise a carboxylic acid oxidized from a primary hydroxyl in the corresponding unoxidized β-O-4 phenylpropanoid unit and a secondary hydroxyl on the oxidized β-O-4 phenylpropanoid unit that is unchanged from the unoxidized β-O-4 phenylpropanoid unit. In various versions of the invention, at least about 10%, at least about 20%, at least about 30%, at least about 40%, at least about 50%, at least about 60%, at least about 70%, at least about 80%, at least about 90%, or more of the oxidized β-O-4 phenylpropanoid units comprise a secondary hydroxyl that remains unchanged from the unoxidized β-O-4 phenylpropanoid unit. In various versions of the invention at least about 10%, at least about 20%, at least about 30%, at least about 40%, at least about 50%, at least about 60%, at least about 70%, at least about 80%, at least about 90%, at least about 95%, at least about 97% or more of the oxidized β-O-4 phenylpropanoid units remain uncleaved. As used herein, "oxidized β-O-4 phenylpropanoid unit" or variants thereof refer to β-O-4 phenylpropanoid units in which any portion or moiety thereof undergoes an oxidation reaction. "Unoxidized β-O-4 phenylpropanoid unit" or variants thereof refer to β-O-4 phenylpropanoid units in which no portion or moiety thereof undergoes an oxidation reaction.

The oxidized lignin may have an average molecular weight of from about 240 Da to about 400,000 Da, such as from about 500 Da to about 200,000 Da, from about 1,000 Da to about 100,000 Da, about 2,000 Da to about 50,000 Da, about 2,500 Da to about 20,000 Da, about 3,000 Da to about 20,000 Da, about 4,000 Da to about 20,000 Da, about 5,000 Da to about 20,000 Da or any combination thereof. Conditions that avoid cleavage of the β-O-4 phenylpropanoid units will generally yield oxidized lignin with higher molecular weights.

Under various oxidation conditions specified herein, the invention is capable of producing polycarboxylated lignin in the form of a polymeric β-hydroxy acid comprising β-O-4 phenylpropanoid units, wherein at least a portion of the β-O-4 phenylpropanoid units each comprise a secondary hydroxyl moiety and a carboxylic acid or carboxylate moiety. Due to the large number of β-O-4 linkages in lignin, efficient conversion of the primary hydroxyl moieties to carboxylic acids is capable of yielding a high density of carboxylic acid functional groups. In various versions of the invention, the resulting polycarboxylated lignin comprises a polymeric β-hydroxy acid comprising at least about 0.05, at least about 0.1, at least about 0.15, at least about 0.2, at least about 0.25, at least about 0.3, at least about 0.35, at least about 0.4 or more and/or up to about 0.5, up to about 0.55, up to about 0.6, up to about 0.65, up to about 0.7, up to about 0.75, up to about 0.8 or more carboxylic acid or carboxylate functional groups per phenylpropanoid unit (ppu, otherwise known as phenylpropane unit or lignin monomer unit). As used herein, the terms "carboxylated" and "polycarboxylated" refers to the presence of carboxyl groups, regardless as to whether the carboxyl groups are in the carboxylic acid (i.e. protonated) or carboxylate (i.e., deprotonated or salt) forms.

The amount of β-O-4 phenylpropanoid units in the polycarboxylated lignin comprising a secondary hydroxyl moiety and a carboxylic acid or carboxylate moiety depends on the efficiency of the particular oxidation reaction, which is a function of reaction time, the accessibility of the of β-O-4 phenylpropanoid units, and other factors. In various versions of the invention, from about 1% to about 100%, such as from about 1% to about 10%, from about 10% to about 20%, from about 20% to about 30%, from about 30% to about 40%, from about 40% to about 50%, from about 50% to about 60%, from about 60% to about 70%, from about 70% to about 80%, from about 80% to about 90%, about 90% to about 100%, or any combination thereof, of the β-O-4 phenylpropanoid units in the polycarboxylated lignin comprise a secondary hydroxyl moiety and a carboxylic acid or carboxylate moiety. In various versions of the invention, less than about 50%, less than about 40%, less than about 30%, less than about 20%, less than about 10%, less than about 7%, less than about 3%, or less than about 1% of the β-O-4 phenylpropanoid units comprise a primary hydroxyl moiety and a ketone moiety (e.g., an oxidized from of the secondary hydroxyl).

The electrochemical oxidation method described herein is very specific with respect to oxidizing primary hydroxyl moieties on β-O-4 phenylpropanoid units to the corresponding carboxylic acids. Therefore, a high percentage of β-O-4 phenylpropanoid units comprising a carboxylic acid or carboxylate moiety in the polycarboxylated lignin also comprise a secondary hydroxyl moiety. In various versions of the invention, at least about 10%, at least about 20%, at least about 30%, at least about 40%, at least about 50%, at least about 60%, at least about 70%, at least about 80%, at least about 90%, or about 100% of the β-O-4 phenylpropanoid units comprising a carboxylic acid or carboxylate moiety also comprise a secondary hydroxyl moiety.

The methods of the invention are also capable of oxidizing primary hydroxyls on phenylpropanoid units other than β-O-4 phenylpropanoid units to corresponding carboxylic acids, such as the primary hydroxyls on β-5 phenylpropanoid units and β-1 phenylpropanoid units. In the case of at least the β-1 phenylpropanoid units, this results in cleavage of the phenylpropanoid units. See Table 1. This oxidation leads to greater net loading of carboxylic acid, on the oxidized lignin. Accordingly, various versions of the invention are capable of generating oxidized β-5 phenylpropanoid units in the oxidized lignin from corresponding unoxidized β-5 phenylpropanoid units in the lignin wherein at least about 10%, at least about 20%, at least about 30%, at least about 40%, at least about 50%, at least about 60%, at least about 70%, at least about 80%, at least about 90%, or more of the oxidized β-5 phenylpropanoid units comprise a carboxylic acid oxidized from a primary hydroxyl in the corresponding unoxidized β-5 phenylpropanoid unit. In various versions of the invention, from about 1% to about 100%, such as from about 1% to about 10%, from about 10% to about 20%, from about 20% to about 30%, from about 30% to about 40%, from about 40% to about 50%, from about 50% to about 60%, from about 60% to about 70%, from about 70% to about 80%, from about 80% to about 90%, about 90% to about 100%, or any combination thereof, of the β-5 phenylpropanoid units in the polycarboxylated lignin comprise a carboxylic acid or carboxylate moiety.

Due to the efficient oxidation of primary hydroxyls, the present methods are capable of oxidizing substantially all of the primary hydroxyls to corresponding carboxylic acids. In various versions of the invention, at least about 10%, at least about 20%, at least about 30%, at least about 40%, at least about 50%, at least about 60%, at least about 70%, at least about 80%, at least about 90%, or more of primary hydroxyls are oxidized to carboxylic acids. In some versions of the invention, the resulting polycarboxylated lignin comprises less than about 1, less than about 0.9, less than about 0.8, less than about 0.7, less than about 0.6, less than about 0.5, less than about 0.4, less than about 0.3, less than about 0.2, less than about 0.1, less than about 0.09, less than about 0.08, less than about 0.07, less than about 0.06, less than about 0.05, less than about 0.04, less than about 0.03, less than about 0.02, less than about 0.01, less than about 0.005, or less than about 0.0001 primary hydroxyls per phenylpropanoid unit (ppu, otherwise known as phenylpropane unit or lignin monomer unit).

Experiments by the inventors indicate that conducting the electrolytic oxidation under conditions in which the total amount of charge (Q) passing through the cell is insufficient can result in the oxidation of the primary hydroxyls to aldehydes rather than carboxylic acids. Conditions in which the total amount of charge passing through the cell is insufficient include running the reaction for an insufficient period of time and/or running the reaction at too low of a pH. Therefore, the electrolytic oxidation is preferably carried out under conditions sufficient (e.g., for a sufficient period of time and/or at a sufficiently high pH) to obtain the percentages of carboxylic acids outlined above. The amount of charge passing through the cell is preferably sufficient to obtain the percentages of carboxylic acids outlined above.

Because of the carboxylic acid or carboxylate moieties in the polycarboxylated lignin, the polycarboxylated lignin has a higher solubility in water than the non-oxidized lignin. In various versions of the invention, the polycarboxylated lignin has a solubility in water of at least about 1 g/L, at least about 3 g/L, at least about 5 g/L, at least about 7 g/L, at least about 10 g/L, or at least about 12 g/L and/or up to about 14 g/L, up to about 16 g/L, up to about 18 g/L, up to about 20 g/L, up to about 22 g/L, up to about 24 g/L, up to about 26 g/L or more at about pH 9 and about 23° C.

In deprotonated forms of the polycarboxylated lignin, such as anionic or salt forms, the majority, if not all, of the carboxylic acid or carboxylate moieties in the β-O-4 phenylpropanoid units will be in the carboxylate form. In various versions of the invention, at least about 10%, at least about 20%, at least about 30%, at least about 40%, at least about 50%, at least about 60%, at least about 70%, at least about 80%, at least about 90%, or about 100% of β-O-4 phenylpropanoid units comprising a carboxylic acid or carboxylate moieties will be in the carboxylate form.

Because the presence of phenolic hydroxyls groups on β-O-4 phenylpropanoid units promotes cleavage thereof, the β-O-4 phenylpropanoid units on the polycarboxylated lignin that are oxidized to any extent, i.e., comprising a carboxylic acid or carboxylate moiety, will be substantially devoid of phenolic hydroxyl groups.

The polycarboxylated lignin can have any of a number of molecular weights depending on the amount of non-β-O-4 linkages in the lignin susceptible to cleavage (see the examples), the pH at which the electrochemical oxidation is performed, the mediator used, and any size-dependent separation that is performed (see below). In various versions of the invention, the polycarboxylated lignin has a molecular weight of from about 240 Da to about 50,000 Da, such as from about 500 Da to about 30,000 Da, from about 1,000 Da to about 20,000 Da, about 2,000 Da to about 20,000 Da, about 2,500 Da to about 20,000 Da, about 3,000 Da to about 20,000 Da, about 4,000 Da to about 20,000 Da, about 5,000 Da to about 20,000 Da.

In some versions of the invention, the polycarboxylated lignin is isolated or directly employed in its acid form for use as a polyacid. In other versions, the polycarboxylated lignin is deprotonated to form a carboxylate or salt before isolation or direct use. Various methods of deprotonation are known in the art, including titration with base followed by isolation, among others.

The term "isolated" or "purified" as applied to components and/or products of the oxidation reaction or processed forms thereof, including unoxidized lignin, oxidized lignin, polycarboxylated lignin, polymeric β-hydroxy acids, cleavage products, solvents, salts, mediators, bases, etc., refer to the separation of at least one component from another. In some versions, polycarboxylated lignin is separated from non-polycarboxylated components of the oxidized lignin. In some versions, products of the oxidation reaction, including various species of the oxidized lignin, are separated from each other by mass. In some versions, the polycarboxylated lignin is separated from one or more of lignin cleavage products, solvents, salts, mediators, and/or bases. In some versions, polycarboxylated lignin species having a higher charge density are separated from polycarboxylated lignin species having a lower charge density. In some versions, oxidized lignin species less than about 240 Da are separated from oxidized lignin species greater than about 240 Da, and/or oxidized lignin species less than about 400 Da are separated from oxidized lignin species greater than about 400 Da, and/or oxidized lignin species less than about 600 Da are separated from oxidized lignin species greater than about 600 Da, and/or oxidized lignin species less than about 800 Da are separated from oxidized lignin species greater than about 800 Da, and/or oxidized lignin species less than about 1000 Da are separated from oxidized lignin species greater than about 1000 Da, and/or oxidized lignin species less than about 5,000 Da are separated from oxidized lignin species greater than about 5,000 Da, and/or oxidized lignin species less than about 7,500 Da are separated from oxidized lignin species greater than about 7,500 Da, and/or oxidized lignin species less than about 10,000 Da are separated from oxidized lignin species greater than about 10,000 Da, and/or oxidized lignin species less than about 15,000 Da are separated from oxidized lignin species greater than about 15,000 Da, and/or oxidized lignin species less than about 20,000 Da are separated from oxidized lignin species greater than about 20,000 Da, and/or oxidized lignin species less than about 50,000 Da are separated from oxidized lignin species greater than about 50,000 Da, and/or oxidized lignin species less than about 75,000 Da are separated from oxidized lignin species greater than about 75,000 Da, and/or oxidized lignin species less than about 100,000 Da are separated from oxidized lignin species greater than about 100,000 Da.

The separation of components and/or products of the oxidation reaction or processed forms thereof can be performed by any of a number of methods well-known in the art, including ion exchange chromatography, size-exclusion chromatography, distillation, extraction, drying, lyophilization, etc. Exemplary distillation methods vacuum distillation, distillation under a protecting gas atmosphere, and steam distillation. Exemplary extraction methods include liquid-phase extraction and solid-phase extraction. Liquid-phase extraction can be performed by admixing with an organic solvent to separate off various products soluble therein. Suitable organic solvents are water-immiscible organic solvents, e.g. hydrocarbons having 5 to 12 carbon atoms such as hexane or octane, chlorinated hydrocarbons having 1 to 10 carbon atoms such as dichloromethane or chloroform, aliphatic ethers having 2 to 10 carbon atoms such as diethyl ether or diisopropyl ether, cyclic ethers or aliphatic esters such as ethyl ethanoate. Halogen-free organic solvents are preferred. In addition, it is possible to extract components with the aid of supercritical fluids. Supercritical $CO_2$ is an exemplary supercritical fluid. Solid-phase extraction can be performed by addition of solid-phase extraction medium. Targeted species are adsorbed to the extraction medium and can then be eluted from the solid phase using solvents known to those skilled in the art.

The polycarboxylated lignin may be purified to various extents. In some versions, the polycarboxylated lignin may form a part of a composition in which the polycarboxylated lignin constitutes from about 1% to about 100%, such as from about 1% to about 10%, from about 10% to about 20%, from about 20% to about 30%, from about 30% to about 40%, from about 40% to about 50%, from about 50% to about 60%, from about 60% to about 70%, from about 70% to about 80%, from about 80% to about 90%, about 90% to about 100%, or any combination thereof, of the mass of the composition. In some versions, the polycarboxylated lignin having a mass or average mass specified herein constitutes about 1% to about 100%, such as from about 1% to about 10%, from about 10% to about 20%, from about 20% to about 30%, from about 30% to about 40%, from about 40% to about 50%, from about 50% to about 60%, from about 60% to about 70%, from about 70% to about 80%, from about 80% to about 90%, about 90% to about 100%, or any combination thereof, of the mass of the composition. The composition may consist of the polycarboxylated lignin or may comprise additional components.

The polycarboxylated lignin has a number of uses. Depending on its preparation, the polycarboxylated lignin can serve as a polyacid, a polyanion, or a polyelectrolyte (polysalt). Various uses for each of these types of compounds are described in the following examples.

After oxidation of lignin, and before or after isolation of the polycarboxylated lignin, the polycarboxylated lignin may undergo acidolysis to generate monomeric and/or oligomeric (dimeric, trimeric, tetrameric, etc.) aromatic compounds. The generated monomeric and/or oligomeric aromatic compounds, or other products of the acidolysis, may then be isolated by any suitable method, including those described herein or known in the art.

The acidolysis may be performed by contacting the oxidized lignin or purified species thereof with acid in an aqueous solvent or aqueous/organic solvent. The pH is preferably in a range of from about 1 to about 6, such as about 1 to about 3. Exemplary acids include hydrochloric acid (HCl), hydrobromic acid (HBr), hydrofluoric acid (HF), hydroiodic acid (HI), formic acid ($CH_2O_2$), phosphoric acid ($H_3PO_4$), sulfuric acid ($H_2SO_4$), boric acid ($B(OH)_3$), tetrafluoroboric acid ($HBF_4$), perchloric acid ($HClO_4$), acetic acid ($CH_3C(O)$—OH), trifluoroacetic acid ($CF_3C(O)$—OH), methanesulfonic acid ($CH_3SO_3H$), solid acid resins containing sulfonic acid sites, and solid acid resins containing benzoic acid sites.

The inventors have found that oxidizing primary hydroxyl groups on β-O-4 phenylpropanoid units without cleaving the β-O-4 phenylpropanoid units, followed by independently digesting the oxidized lignin through acidolysis, provides higher yields of monomeric aromatic compounds than direct cleavage of the β-O-4 phenylpropanoid units through electrochemical oxidation at high pH. In various versions of the invention, the acidolysis of electrochemically oxidized lignin produces a monomeric aromatic compound yield of from about 5% to about 50%, such as about 10% to about 50%, about 15% to about 50%, about 20% to about 50%, about 25% to about 50%, about 30% to about 50%, about 20% to about 45%, about 20% to about 40% about 20% to about 35%, about 25% to about 35% or any combination thereof. As used herein, "monomeric aromatic compound" refers to any compound comprising one and only one aromatic (e.g., substituted phenyl) group.

Exemplary compounds yielded by the acidolysis include syringic acid, guaiaol, vanillic acid, syringaldehyde, hydroxybenzoic acid, vanillin, syringyl diketone, guaiacyl diketones, kimethoxybenzoquinone, benzoic acid, and any others described or shown elsewhere herein.

It is predicted that the reactivities and resulting products shown herein with the lignin models having the described linkages will also occur in lignin with units comprising corresponding linkages.

The elements and method steps described herein can be used in any combination whether explicitly described or not.

All combinations of method steps as used herein can be performed in any order, unless otherwise specified or clearly implied to the contrary by the context in which the referenced combination is made.

As used herein, the singular forms "a," "an," and "the" include plural referents unless the content clearly dictates otherwise.

Numerical ranges as used herein are intended to include every number and subset of numbers contained within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, from 5 to 6, from 1 to 9, from 3.6 to 4.6, from 3.5 to 9.9, and so forth.

All patents, patent publications, and peer-reviewed publications (i.e., "references") cited herein are expressly incorporated by reference to the same extent as if each individual reference were specifically and individually indicated as being incorporated by reference. In case of conflict between the present disclosure and the incorporated references, the present disclosure controls.

It is understood that the invention is not confined to the particular construction and arrangement of parts herein illustrated and described, but embraces such modified forms thereof as come within the scope of the claims.

EXAMPLES

Example 1. Electrochemical Nitroxyl-Mediated Oxidation of Lignin and Conversion to Low Molecular Weight Aromatic Compounds The use of biomass as a renewable resource of chemicals and energy is becoming progressively indispensable and will be crucial in the foreseeable future in light of the depletion of fossil fuels (Zakeski et al. 2010). Cellulose and lignin are the main components of biomass and are some of the most abundant terrestrial biopolymers (Boerjan et al. 2003), making these polymers promising candidates for use as feedstock for the renewable production of chemicals and fuels. Enzymatic hydrolysis followed by fermentation is already utilized for the production of ethanol from cellulose (Li et al. 2015). Attention has therefore focused on lignin as a polyaromatic byproduct of this process.

The depolymerization of lignin, however, has proved difficult due at least in part to the different types of linkages and diversity in structure (Boerjan et al. 2003). The main existing protocols for the breakdown of lignin include acid- or base-catalyzed depolymerization, pyrolysis, hydroprocessing, and oxidation. Acid- or base-catalyzed depolymerization has been used for several years in the delignification of cellulose but results only in partial depolymerization. The other three methods introduce significant structural change in lignin using chemical, thermal, or thermochemical processes that cause breakdown of lignin. The order of operational temperature, low to high, for these processes is typically 0-250° C. for oxidation, 100-350° C. for hydroprocessing, and 450-700° C. for pyrolysis. The high operational temperatures of hydroprocessing and pyrolysis make the systematic optimization and control of these processes difficult. The chemistry of pyrolysis, for example, is a black box. Oxidation methods, by contrast, permit greater control over the process.

Certain oxidation methods can selectively oxidize specific motifs in lignin (Rahimi et al. 2013, U.S. Pat. No. 8,969,534). Downstream cleavage of the oxidized lignin (Rahimi et al. 2014, Bruijninex et al. 2014) can yield specific compounds. The present example provides a method for the controlled oxidization of lignin that results at least in part in the selective oxidation of primary hydroxyls to corresponding carboxylic acid or carboxylate groups in specific lignin motifs. Subsequent cleavage of the oxidized lignin yields a number of industrially relevant aromatic compounds.

Evaluation of Electrocatalytic Oxidation.

Hydroxyl groups are quite abundant in various lignins (by average, more than 4 mmol g$^{-1}$). The ability to oxidize the hydroxyl groups in lignin using nitroxyl-mediated electrochemical oxidation was evaluated using cyclic voltammetry. Cyclic voltammetry is a common method for studying simple to complex catalytic reactions as well as redox processes (Nicholson et al. 1964 and Costentin et al. 2012). 2,2,6,6-Tetramethylpiperidin-1-yl)oxy (TEMPO) or derivatives thereof were used as exemplary stable nitroxyl radicals.

Cyclic voltammetry measurements were performed at a scan rate of 10 mV s$^{-1}$ in the absence and presence of 10 mM of various lignin models in a mixture of water and acetonitrile (70:30) containing 0.07 M HCO$_3^-$ and 0.07 M CO$_3^{2-}$. The working electrode was a glassy carbon disc, and the counter electrode was a platinum wire. The potential of the working electrode was measured versus Ag/AgCl as a reference electrode.

Figure 4A:
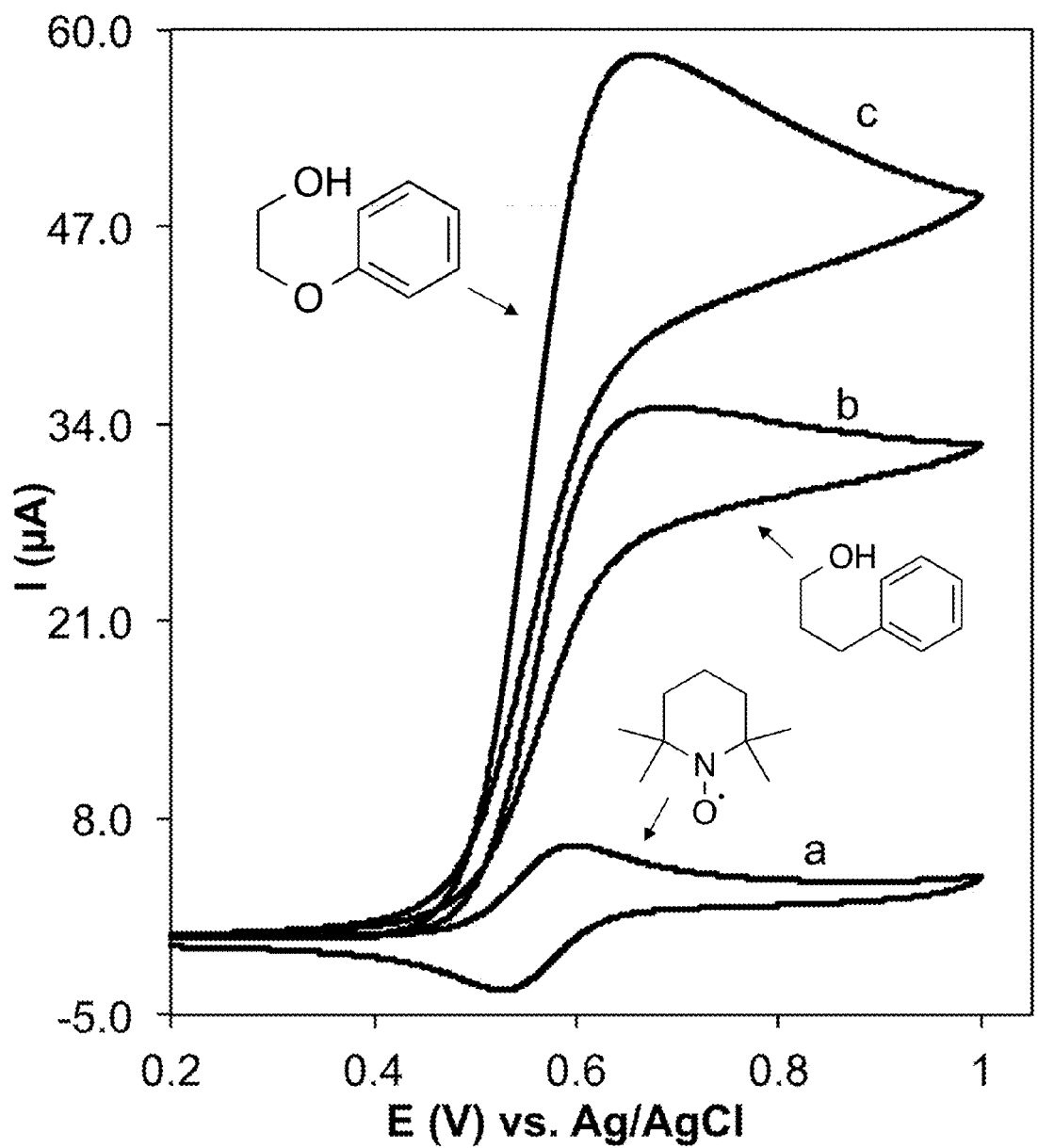
FIGS. 4A-4C show cyclic voltammograms of 1.0 mM TEMPO in the absence (curve a) and presence of 10 mM of various lignin models (curves b-h). Curve f in FIG. 4B shows a cyclic voltammogram in the presence of two lignin models, wherein each lignin model is present at a concentration of 10 mM. Solution condition: $H_2O$/MeCN (70/30), $HCO_3^-/CO_3^{2-}$ electrolyte (pH 10), scan rate 10 mV $s^{-1}$.
Figure 5:
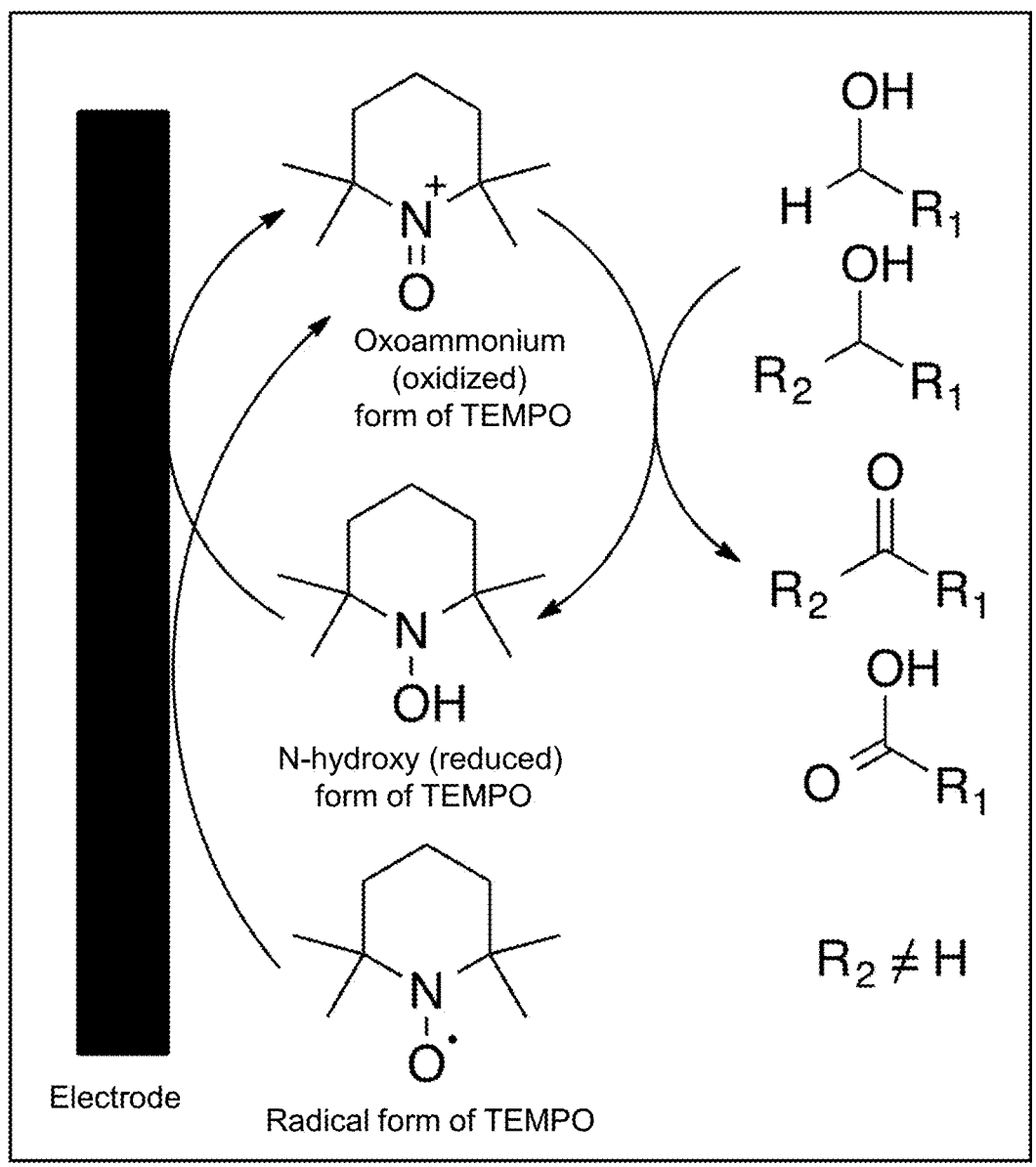
FIG. 5 shows a schematic of the oxidative mechanism and catalytic turnover of TEMPO in its radical, N-hydroxy (reduced), and oxoammonium (oxidized) forms.

FIG. 4A, demonstrates the voltammetric responses of TEMPO in the absence and presence of various hydroxyl-containing lignin models under mild basic conditions. The cyclic voltammograms (CV) of TEMPO in the absence of lignin models (FIG. 4A, curve a) shows an anodic peak corresponding to oxidation of TEMPO from its radical form to an oxoammonium form and a cathodic peak (in negative going scan) for the reduction of the oxoammonium form back to the radical form at the electrode surface. The presence of lignin models with TEMPO (FIG. 4A, curves b and c) results in an increase in the oxidation peak and a decrease and disappearance of the reduction peak, indicating the consumption of the oxoammonium form and regeneration of the reduced (n-hydroxy) form of TEMPO. The oxidation peak in the presence of lignin models is proportional to the catalytic turnovers that occur on the CV time scale (FIG. 5). Thus, the increase in the oxidation peaks in curves b and c with respect to curve a in FIG. 4A indicate catalytic turnover of TEMPO through oxidation of the lignin models.

Figure 4B:
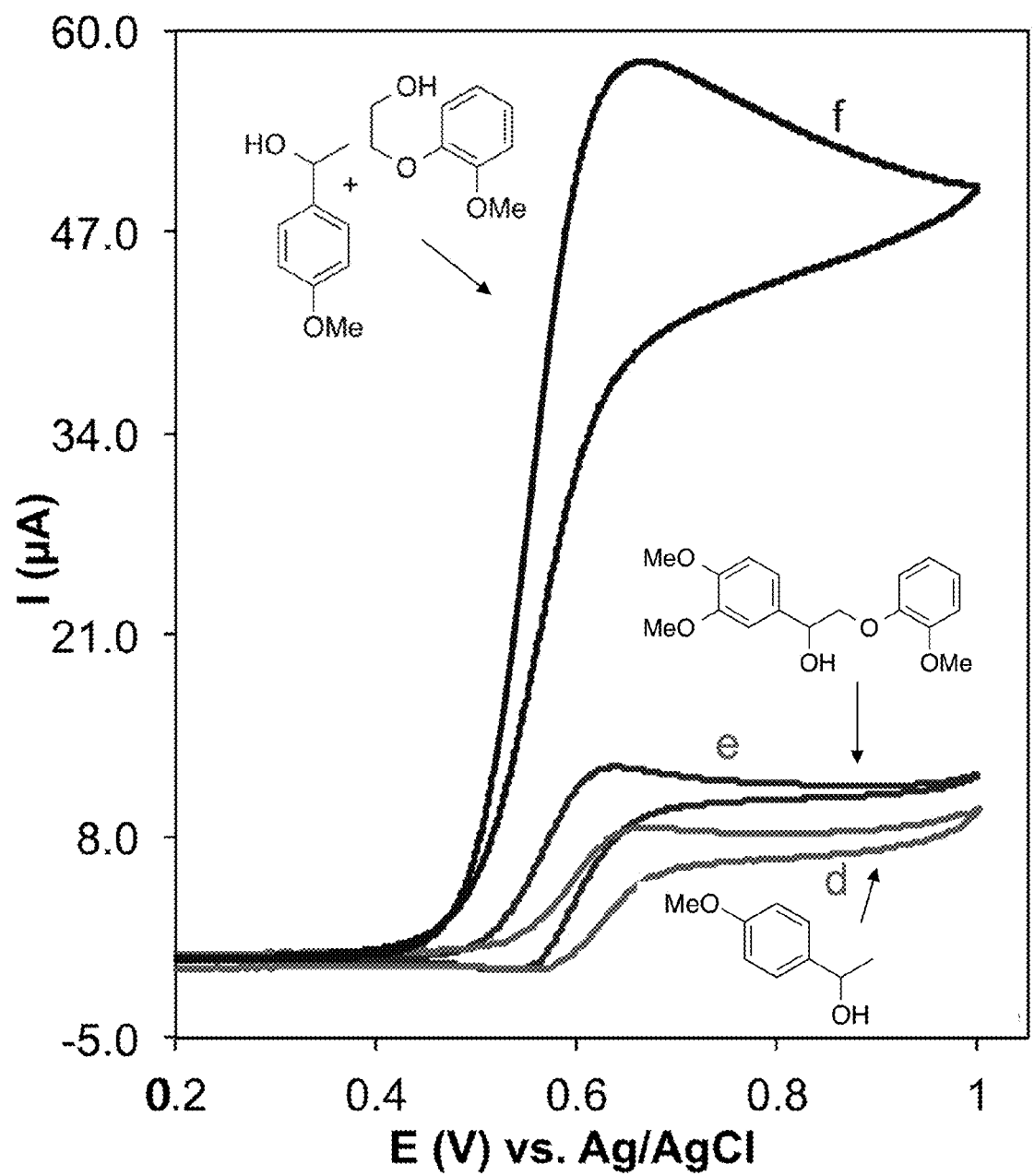
Figure 4C:
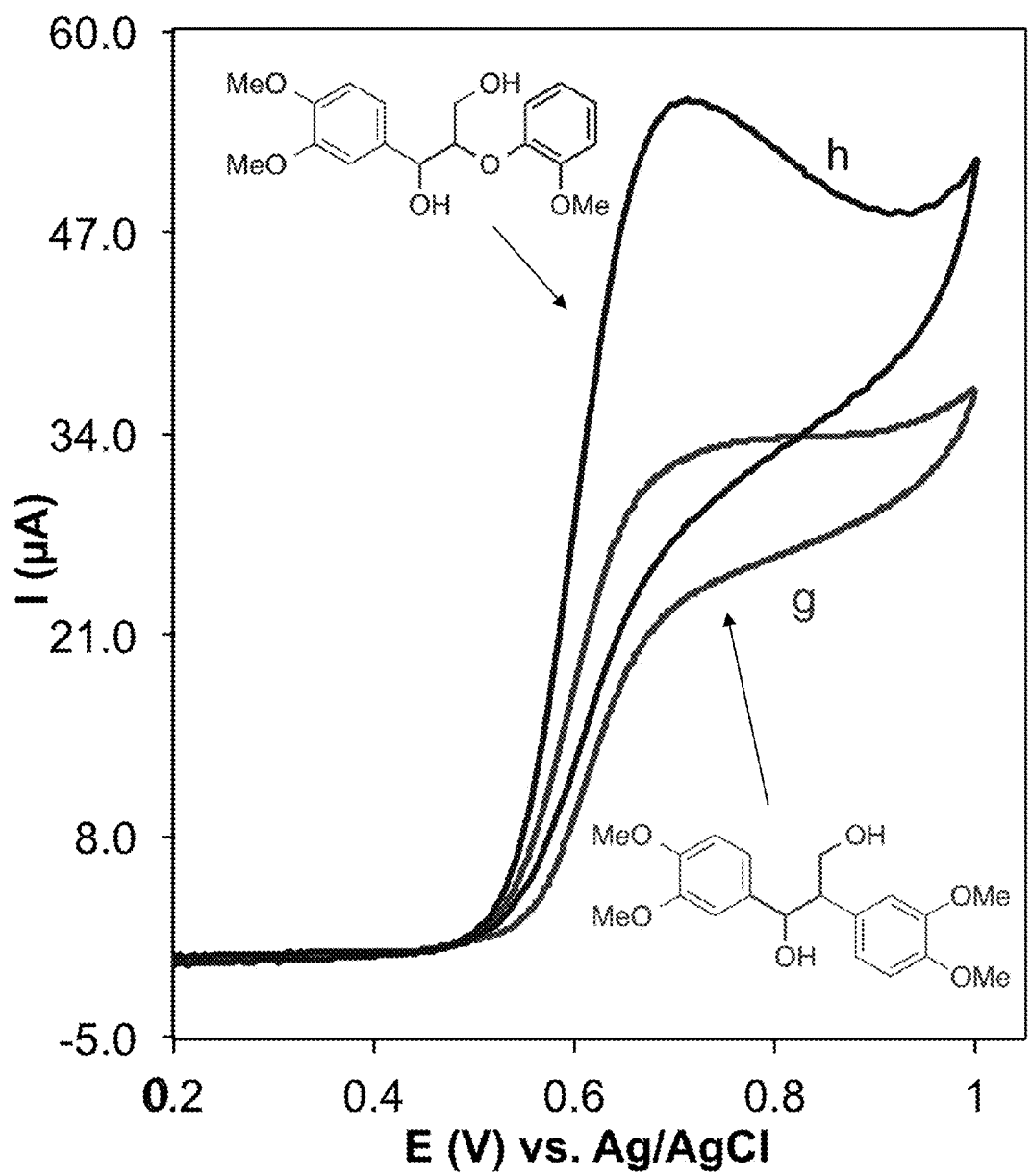

The CVs of various lignin models in FIGS. 4A-4C clearly show the higher reactivity of oxoammonium toward the oxidation of primary hydroxyls. This is evidenced by the greatly enhanced catalytic turnover in the presence of lignin containing primary hydroxyls (FIG. 4A, curves b and c; FIG. 4B, curve f; FIG. 4C, curves h and g) compared to the catalytic turnover in presence of lignin containing only secondary hydroxyls (FIG. 4B, curves e and d). The CVs also show that the presence of an etheric bond near the primary hydroxyl, as occurs in β-O-4 linkages, enhances the oxidation. Compare, for example, the oxidation current of lignin models containing both etheric and primary hydroxyl functional groups (FIG. 4A, curve c; FIG. 4C, curve h) with the oxidation current of lignin models containing only primary hydroxyl functional groups (FIG. 4A, curve b; FIG. 4C, curve g, respectively). By contrast, the presence of electron-donating methoxy groups on the aromatic ring does not affect oxidation by the oxoammonium (compare FIG. 4A, curve c, with FIG. 4B, curve f). The possibility of selective oxidation of primary hydroxyl groups in the presence of secondary hydroxyl groups is suggested by curves c, f, and h in FIGS. 4A-4C having the same oxidation peak currents, which show that the addition of secondary hydroxyls to primary hydroxyls, either on a separate lignin compound (curve f in FIG. 4B) or the same lignin compound (curve h in FIG. 4C), does not increase the catalytic turnover rate and therefore does not provide an additive effect. The data also demonstrate the selective oxidation of phenoxyethanol over 1-phenylethanol; curves c and f have the same oxidation peak current, which indicates that the phenoxyethanol was solely responsible for consuming the oxoammonium in curve f.

Characterization of Electrochemical Oxidation Products.

Controlled potential bulk electrolysis was used to obtain and characterize oxidation products of various lignin models. The controlled potential bulk electrolysis was performed at 0.65 V for TEMPO and 0.75 V for acetamide-TEMPO (ACT) with 0.1 mM of each lignin model in 10 mL of H$_2$O/Acetonitrile (70:30) solution containing 0.07 M HCO$^{3-}$ and 0.07 M CO$_3^{2-}$ (pH 10). The reactions were terminated when the currents reached to 5% of the initial current.

The results of the electrolysis reactions are summarized in Table 1.

TABLE 1

Electrochemical oxidation of various lignin models mediated by TEMPO under basic conditions.

| Entry | Substrate | Product(s) (Yield) |
|---|---|---|
| 1[a] | 3-phenyl-1-propanol | 3-phenylpropanoic acid (94%) |
| 2[a] | 2-phenoxyethanol | phenoxyacetic acid (93%) |
| 3[b] | 1-(4-methoxyphenyl)ethanol | 4'-methoxyacetophenone (95%) |
| 4[b] | 2-(2-methoxyphenoxy)-1-phenylethanol | 2-(2-methoxyphenoxy)-1-phenylethanone (97%) |
| 5[b] | 1-(3,4-dimethoxyphenyl)-2-(2-methoxyphenoxy)ethanol | 1-(3,4-dimethoxyphenyl)-2-(2-methoxyphenoxy)ethanone (98%) |
| 6[a] | 1,2-bis(3,4-dimethoxyphenyl)propane-1,3-diol | 3,4-dimethoxybenzaldehyde (79%) + 2-(3,4-dimethoxyphenyl)acetic acid (86%) |
| 7[a] | 1-(3,4-dimethoxyphenyl)-2-(2-methoxyphenoxy)propane-1,3-diol | 3-(3,4-dimethoxyphenyl)-2-(2-methoxyphenoxy)-3-hydroxypropanoic acid (89%) |

TABLE 1-continued

Electrochemical oxidation of various lignin models mediated by TEMPO under basic conditions.

| Entry | Substrate | Product(s) (Yield) |
|-------|-----------|--------------------|
| 8[c] | [S-type phenolic β-O-4 dimer with HO, OMe, MeO, OH, OMe substituents] | [o-quinone with OMe, MeO] 52% + [aryloxyacetic acid derivative with OMe] 13% + [syringic acid derivative: HO, OMe, MeO, COOH] 36% |
| 9[d] | [syringyl alcohol: HO, OMe, MeO, CH2OH] | [2,6-dimethoxyquinone] 59% + [syringic acid: HO, OMe, MeO, COOH] 6% |

Conditions: 0.1 mM of each lignin model in 10 mL of $H_2O$/Acetonitrile solution, $HCO_3^-$/$COHD^{2-}$ electrolyte (pH 10), electrolysis at 0.65 V for TEMPO and 0.75 V for ACT, the reactions were terminated when the currents reached 5% of the initial current.
[a]Consumed charge: 2 to 2.2 F/mol.
[b]Consumed charge: 4 to 4.3 F/mol,
[c]NMR yields (internal standard = 1,3,5-Trimethoxybenzene), the other reported yield are isolated yield.
[d]Direct electrochemical oxidation of this model also yielded same products.

The electrocatalytic reaction was able to oxidize both primary hydroxyl groups (entries 1, 2, 6, 7, and 8) and secondary hydroxyl groups (entries 3, 4, 5, and 6) on the lignin models. The primary hydroxyls were oxidized to corresponding carboxylic acids, and the secondary hydroxyls were oxidized to corresponding ketones (or aldehydes upon cleavage). Oxidation of a non-phenolic β-O-4 model (entry 7) as an example of the most abundant lignin linkage yielded formation of corresponding β-hydroxy acid as a product of specific oxidation of the primary hydroxyl group. No product related to oxidation of the secondary hydroxyl group was observed, and further attempts for oxidation of the derived β-hydroxy acid even under strong basic condition yielded just partial oxidation (less than 30%) of secondary hydroxyl group. This is the first known report on the specific oxidation of the primary hydroxyl group of a β-O-4 lignin model. Oxidation of a β-1 model (entry 6) lead to decent yields of cleavage products via retro-aldol reaction. Formation of aldehyde followed by cleavage and oxidation of non-benzylic aldehyde to carboxylic acid is the most probable mechanism for this reaction. Oxidation of benzaldehyde to benzoic acid is not favored due to it lower affinity for hydrate formation. Oxidation of a phenolic β-O-4 model (entry 8) resulted in cleavage of the compound. Most phenolic lignin models undergo direct electron transfer at the electrode surface. Electrochemical oxidation of S-type phenolic dimer, at the same potential as the peak potential of TEMPO, yields formation monomeric compounds with o-quinone as the major component. It should be mentioned that applying the same electrochemical potential to syringaldehyde as one of the possible monomers yields 2,6-dimethoxyquinone as well.

Most oxidative treatments of lignin facilitate the oxidation of benzylic (secondary) hydroxyl group to ketones. By contrast, utilizing TEMPO as an exemplary sterically hindered organocatalyst for alcohol oxidation enabled us to selectively oxidize the primary hydroxyl group of β-O-4 units under basic conditions.

Cleavage of β-O-4 linkage.

Considering the abundance of the β-O-4 linkage, the possibility of its one-step cleavage has been studied in more detail. Various reaction conditions have been considered, and some of the obtained trends are summarized in Table 2.

TABLE 2

Oxidation versus oxidative cleavage of β-O-4 lignin linkage.

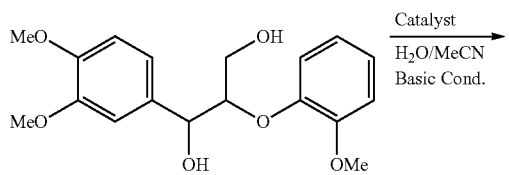 [SMILES: COc1ccc(C(O)C(CO)Oc2ccccc2OC)cc1OC]

TABLE 2-continued

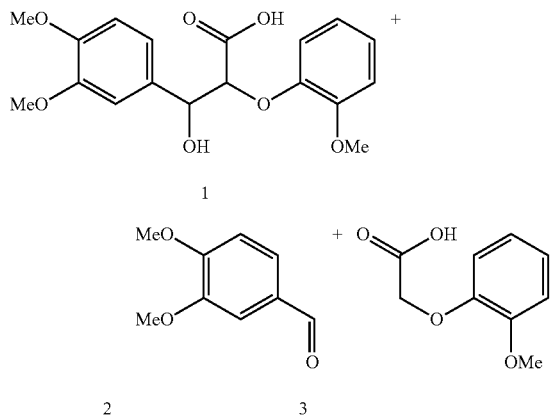

| Entry | Catalyst | Solvent Ratio (H₂O/MeCN) | Base Conc. (pH) | 1 (%) | 2 (%) | 3 (%) |
|---|---|---|---|---|---|---|
| 1 | TEMPO | 75/25 | $HCO_3^-$ 0.13 M $CO_3^{2-}$ 0.02 M (9) | 95 | 3 | 0 |
| 2 | TEMPO | 75/25 | $HCO_3^-$ 0.07 M $CO_3^{2-}$ 0.07 M (10) | 89 | 9 | 7 |
| 3 | TEMPO | 75/25 | $CO_3^{2-}$ 0.15 M (11.5) | 65 | 33 | 28 |
| 4 | TEMPO | 100/0 | $PO_4^{3-}$ 0.15 (12.5) | 55 | 43 | 37 |
| 5 | ACT | 100/0 | $PO_4^{3-}$ 0.15 (12.5) | 9 | 88 | 76 |

Conditions: 0.1 mM alcohol in 10 mL of H₂O/acetonitrile solution, electrolysis at 0.65 V for TEMPO and 0.75 V for ACT. The reactions were terminated when the currents reached 5% of the initial current Consumed charge: 4 to 4.3 F/mol. The reported yields are NMR yields (internal standard = 1,3,5-trimethoxybenzene).

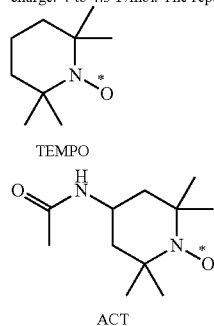

The data in Table 2 show the cleavage of the β-O-4 linkage by electrocatalytic oxidation at higher pH values. At pH values more than 12 (Table 2, entry 4), almost half of the β-O-4 lignin model undergoes oxidative cleavage in one step using TEMPO as an electrocatalytic mediator. At pH values higher than 12, the oxoammonium is not stable enough for completion of the reaction.

For screening and achieving maximum yield of cleavage products, electrochemical oxidation mediated by acetamido-TEMPO (ACT) as another economically viable and potentially scalable electrocatalyst was examined. At all of the pH values, the yields of monomeric compounds were higher for ACT compared to TEMPO (data not shown). Use of ACT as a mediator under strongly basic conditions (pH ~12.5) results primarily in monomeric products (Table 2, entry 5).

Although the use of stronger bases than those shown in Table 2 is possible, it should be mentioned that using a weaker base ($PO_4^{3-}$) at a higher concentration is preferred to using a stronger base ($OH^-$) at a lower concentration. This minimizes the possibility of the generated carboxylic acid neutralizing the base at low concentration.

A possible mechanism for the oxidative cleavage of the β-O-4 linkages is retro-aldol cleavage that occurs in the absence of sufficient oxoammonium:

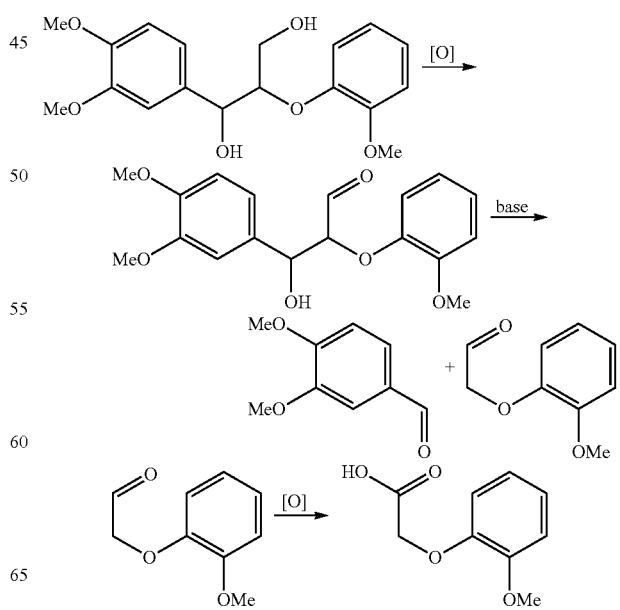

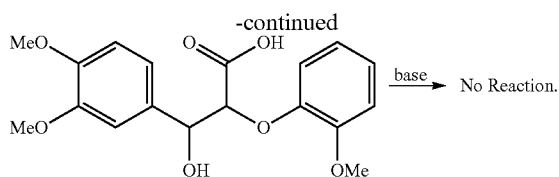
→ base → No Reaction.

Comparing the concentration profiles of aldehyde and acid yielded from oxidation of 3-phenyl-1-propanol and 2-phenoxyethanol will be helpful for investigating the oxidative cleavage of β-5 versus the non-cleaving oxidation of β-O-4.

Acid-Mediated Cleavage of Oxidized Lignin Model.

Most reports of electrochemical oxidation of lignin indicate a low yield of monomeric compounds due to rearrangement and oligomerization of the derived monomeric intermediates under oxidative conditions (Constant et al. 2012, Parpot et al. 2000, Schmitt et al. 2015). Despite successful cleavage of dimeric lignin model compounds, our attempt for deriving high yields of monomeric compounds by one-step oxidative cleavage from lignin were not successful for obtaining more than 8% yield under strongly basic conditions optimized for the lignin models. The possibility of direct and mediated oxidative polymerization of expected monomers, especially phenol derivatives, seems to be the main reason for the low yield of monomeric compounds. We therefore sought alternative methods for obtaining monomeric compounds from the oxidized lignin.

Base-catalyzed cleavage has been performed on β-hydroxy acids to obtain monomeric compounds (Rondestvedt et al. 1956). However, the presence of the etheric bond in β-O-4-derived β-hydroxy acids makes these β-hydroxy acids resistant toward base-catalyzed cleavage (Ganguly et al. 2011). We therefore tested several acid treatments on an exemplary β-hydroxy acid lignin model. As shown in Table 3, acid treatment of the exemplary (3-hydroxy acid gives a high yield of monomeric aromatic compounds. Treatment with formic acid gives the highest yield.

TABLE 3

Treatment of an exemplary β-hydroxy acid under various acidic conditions and the obtained cleavage products.*

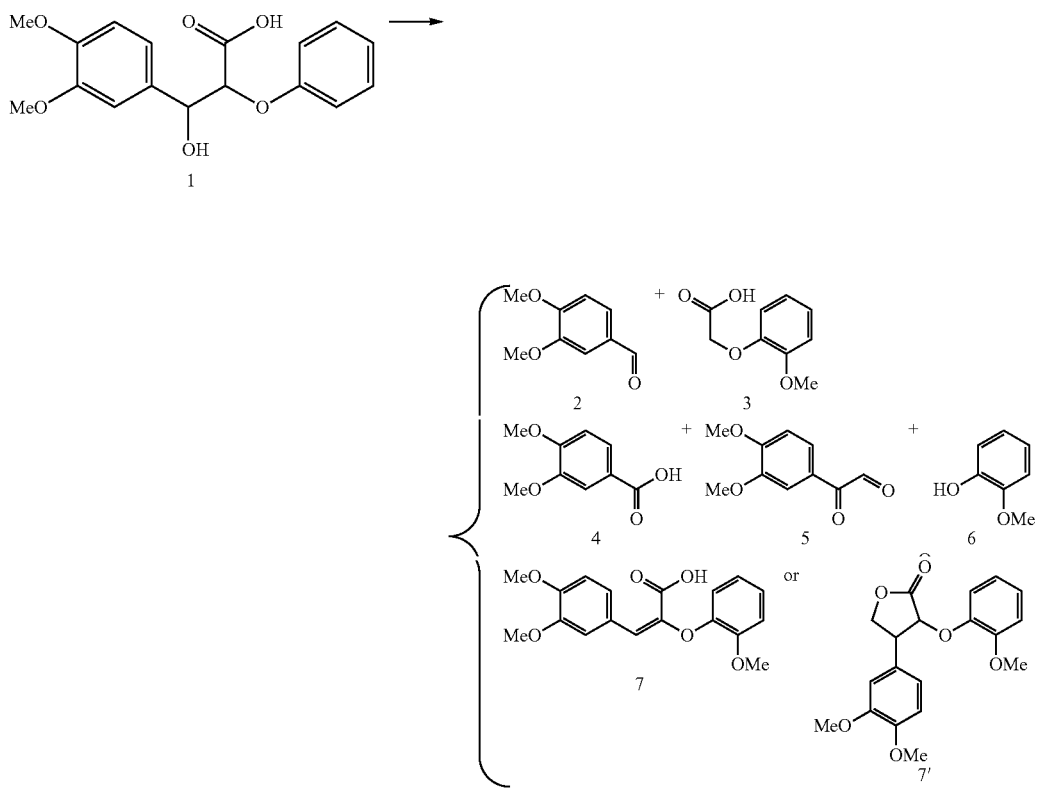

| Treatment Condition | 1 | 2 | 3 | 4 | 5 | 6 | 7 or 7' | Cleavage Yield |
|---|---|---|---|---|---|---|---|---|
| HCl/CH$_3$OH/H$_2$O (5/50/45) | 16 | 28 | 12 | 4 | 15 | 18 | 5 | 47 |
| CH$_3$CO$_2$H/H$_2$O (90/10) | 46 | 21 | 9 | 2 | 21 | 26 | 2 | 44 |
| HCO$_2$H/H$_2$O (90/10) | 5 | 46 | 18 | 5 | 25 | 37 | 7 | 76 |
| HCO$_2$H/H$_2$O/HCO$_2$Na (90/9/1) | 4 | 47 | 23 | 6 | 26 | 41 | 8 | 79 |

*Yields are expressed as percents.

Oxidation and Acid-Mediated Cleavage of Poplar Lignin.

Poplar lignin was isolated using mild acidolysis according to a protocol adapted from Hibino et al. 1994. Bround (e.g., 1 mm Wiley-milled) wood sample (10 g) was suspended in 120 ml of dioxane/water mixture (9/1, v/v) containing 0.2 M HCl. The suspension was refluxed under gentle N$_2$ bubbling and magnetic stirring for 30 min. The cooled mixture was vacuum-filtered through porcelain Büchner funnel (Whatman filter paper No 4). The residue was washed three times with 50 ml of dioxane/water mixture (9/1, v/v). All the filtrates were pooled. The pH of the resulting solution was adjusted to 3-4 (saturated NaHCO$_3$ aqueous solution). The solution was thereafter concentrated to about 50 ml by rotary-evaporation (45° C.). Isolated lignin was precipitated by pouring the concentrated solution into a large volume of cold water (500 ml). The precipitate was recovered by centrifugation (30 min at 1200 g, 4° C.), washed with about 100 ml of pure water, centrifuged again, and freeze-dried.

Figure 6B:
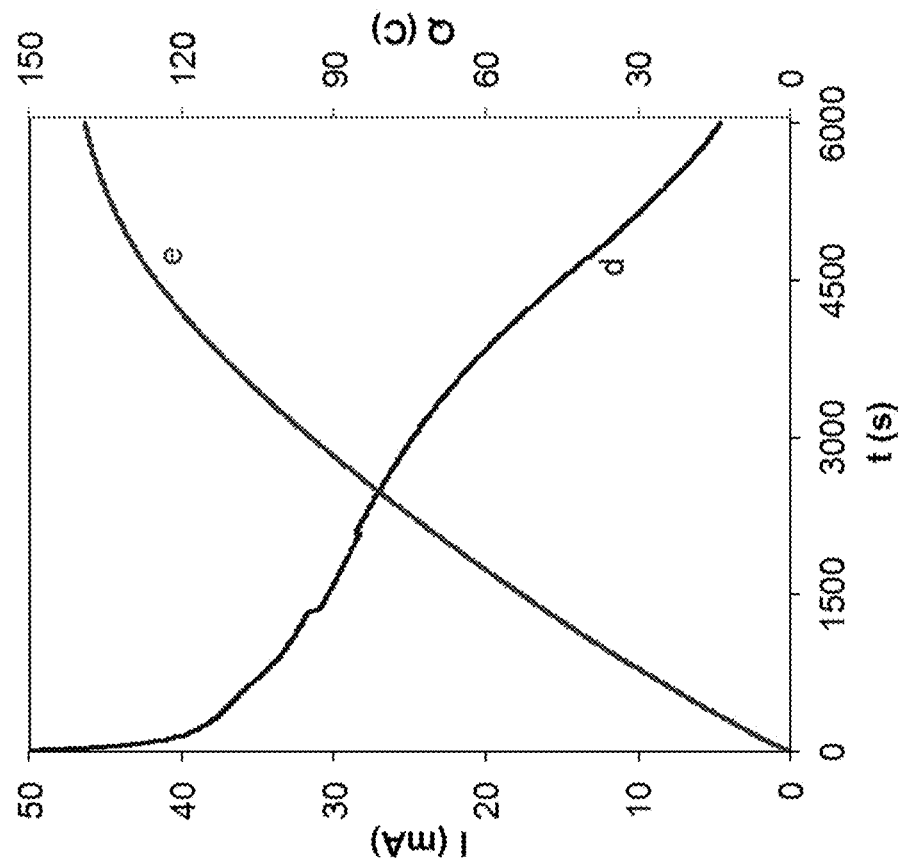
FIG. 6B shows a plot of the consumed charge (curve d) and obtained current (curve e) with bulk electrolysis of popular lignin.
Figure 6A:
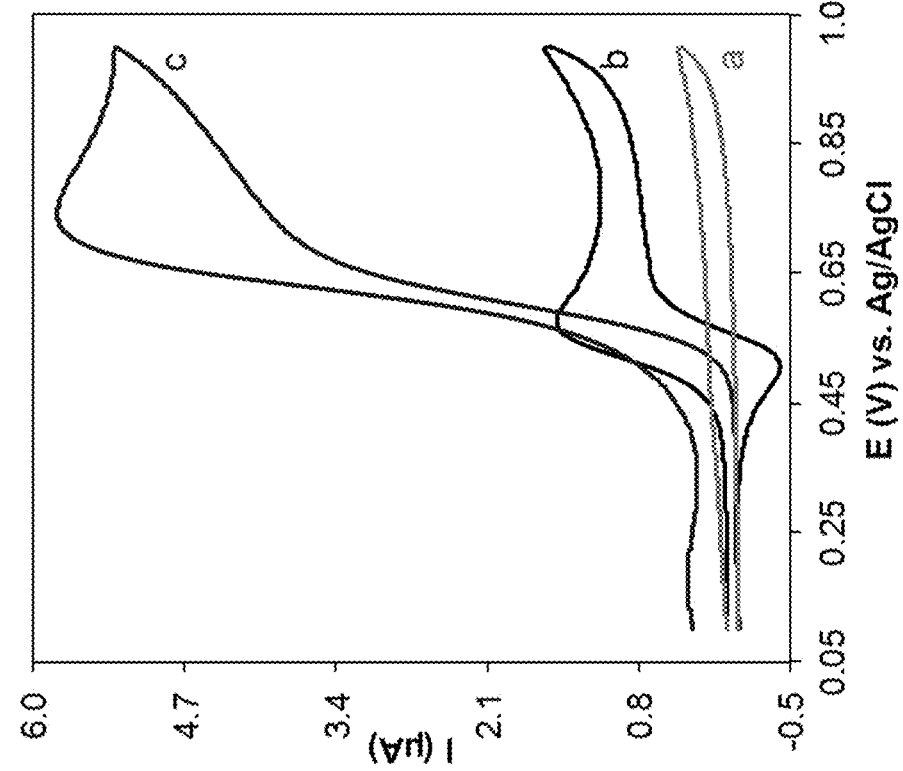
FIG. 6A shows cyclic voltammograms of poplar lignin (curve a), TEMPO (curve b) and mixture of TEMPO and poplar lignin (curve c).

The electrocatalytic activity of TEMPO toward the oxidation of isolated poplar lignin was evaluated by cyclic voltammetry in H$_2$O/Acetonitrile (70:30) solution containing 0.07 M HCO$_3^-$ and 0.07 M CO$_3^{2-}$ (pH 10). The CV of TEMPO in the presence of the poplar lignin showed a significant increase in the oxidation current, indicating the catalytic activity of oxoammonium toward the oxidation of hydroxyl groups in the lignin (FIG. 6A). Controlled potential bulk electrolysis of isolated poplar lignin mediated by TEMPO was performed also under same condition as voltammetric experiments. Bulk electrolysis of the lignin showed consumption of more than 2e$^-$ per each monomer unit of lignin (2.4e$^-$ per each 180 AU of lignin or 2.4 mF per each 180 mg of lignin) (FIG. 6B). The reactions were terminated when the currents reached 5% of the initial current. These results indicate efficient electrocatalytic activity of the nitroxyl radical toward the oxidation of the 1° hydroxyl group of poplar lignin.

Treatment of the oxidized lignin by formic acid yielded 30% of monomeric aromatic compounds. The structure and yield of the identified aromatic compounds are listed below:

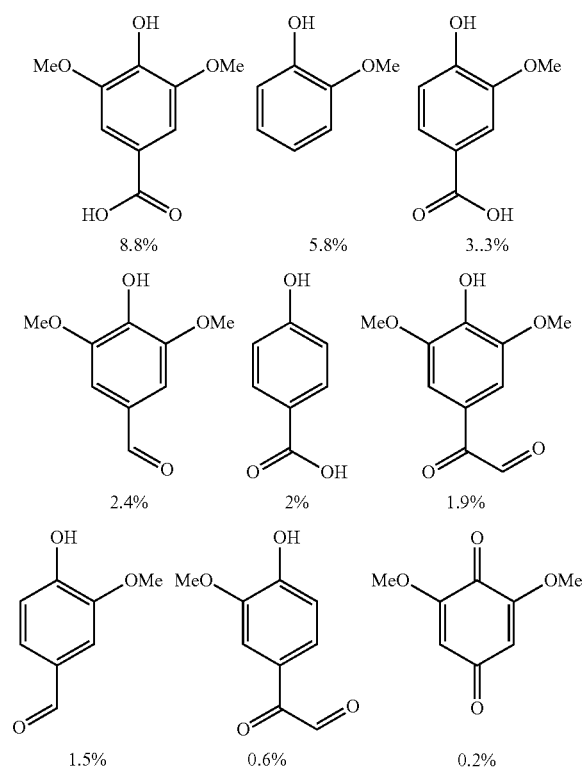

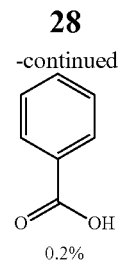

0.2%

Example 2. Polycarboxylated Lignin: a New Polyelectrolyte/Polycarboxylic Acid Lignin is the second most abundant renewable biopolymer next to cellulose (Wang et al. 2015). Lignin is widely available as a major byproduct of industrial processes involved in retrieving cellulose, such as in cellulosic ethanol production and paper production. For several years, the majority of lignin has been combusted for heat and power generation, e.g., in the recovery section of the kraft process, which is a low value application (Konduri et al. 2015). It was known and is becoming clear that lignin, as an aromatic polymer that makes up 15-30% of biomass, can be considered as the major renewable source of aromatic chemicals. Several efforts have been devoted to valorization of lignin for deriving monomeric aromatic compounds and are still ongoing (Li et al. 2015). However, to date, lignin is the only biopolymer for which there is no industrial process for its breakdown. The lack of a regular structure and diverse molecular linkages, which make lignin the most slowly decomposing components of dead vegetation and confer mechanical strength to the cell wall in plants, complicate the industrial depolymerization of lignin (Ten et al. 2015).

A possible option for the utilization of lignin that offers both economic and environmental benefits is derivatizing the functional groups of lignin for specific applications. Different chemical modification pathways have been investigated to introduce new chemical functional groups in the chemical structure of lignin to enhance and expand its range of possible applications and to add more value to the lignin (Laurichesse et al. 2014). Examples include dealkylation, demethylation, and formation of dimethyl sulfide. Demethylated lignin can be used for making new water resistant and formaldehyde-free wood adhesive (Liu et al. 2006). Oxidation of dimethyl sulfide gives dimethyl.

One of the most promising structural changes in lignin is the introduction of negatively or positively charged functional groups in structure of lignin. Introducing charged functional groups in lignin changes the nature of lignin from a hydrophobic polyaromatic to an amphiphilic polymer with significantly higher solubility than native lignin in aqueous solutions (Konduri et al. 2015). These two significant changes make the charged lignin more suited for application in aqueous solutions. Lignosulfonate, or sulfonated lignin, is a byproduct of the pulp industry that serves as an example of a lignin-derived, water-soluble anionic polyelectrolyte. Lignosulfonates can be used as cement and adhesive additives, copolymers in biocomposites, reinforcements for polymers, adsorbents, organic expanders in modern lead/acid batteries, flocculants for water treatment, additives for food packaging, and even additives in cosmetics (Upton et al. 2016, Lebo et al. 2001). Amine salts serve as an example of a cationic lignin derivative (U.S. Pat. No. 4,740,591). These amine salts are used additives in water-based pigment printing compositions.

Lignin is considered to be a macropolyol (Laurichesse et al. 2014) and has abundant hydroxyl groups particularly suited for functional derivatization. Lignins can have both phenolic hydroxyl groups and aliphatic hydroxyl groups on the side chains. The abundance of these hydroxyl groups, especially the phenolic hydroxyls, varies for various lignins. However, the β-aryl ether (β-O-4) linkage bearing one primary (1°) and one secondary (2°) hydroxyl group (FIG. 2A) is the most dominant linkage in lignin structure and constitutes more than half of the linkage structures of lignin. In hardwoods, this linkage can constitute up to 65% or more of the lignin linkages (Zakzeski et al. 2010).

Figure 7:
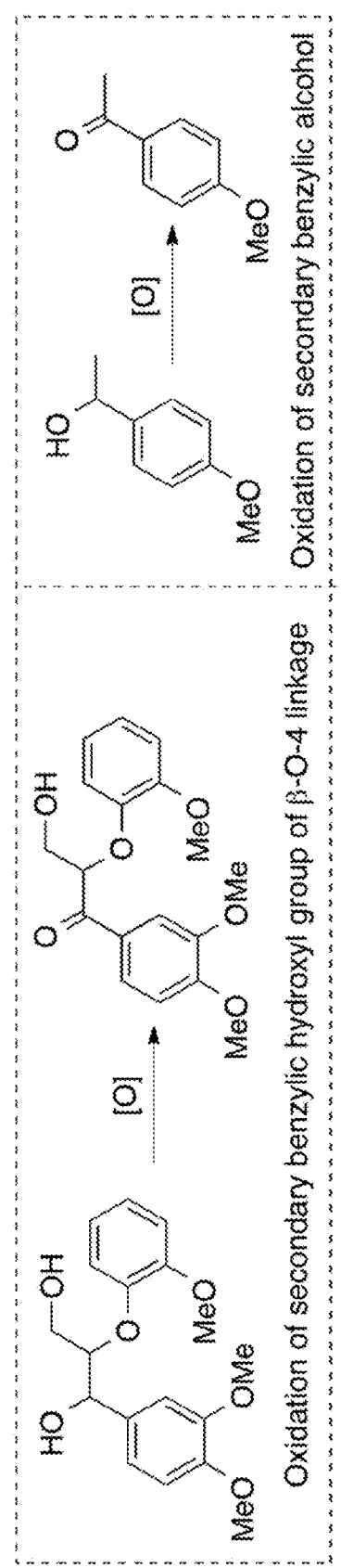
FIG. 7 shows the oxidation of the secondary benzylic hydroxyl group of a β-O-4-linked dimeric lignin model (left panel) and secondary benzylic alcohol (right panel) with prior art oxidation methods.

As the β-O-4 linkage is the most frequent linkage in lignin, most of the efforts that have been devoted to chemical modification of lignin have focused on this linkage, and several strategies have employed oxidation (Roberts et al. 2010). Nowadays, oxidation of the β-O-4 lignin unit is an established protocol for activation of lignin (Li et al. 2015, Rahimi et al. 2013, Rahimi et al. 2014). But among the two hydroxyl groups in the β-O-4 linkage, only the 2° benzylic hydroxyl group has been shown to be amenable to oxidation. All the reported oxidation protocols yield formation of a ketone from the 2° hydroxyl group (FIG. 7, left panel). The same oxidation pathway has been observed also for monomeric aromatic compounds with a 2° benzylic hydroxyl group (FIG. 7, right panel). To the best of our knowledge, there is no report on oxidation of the 1° hydroxyl group of lignin and the β-O-4 linkage.

The main objective of the present example is to illustrate the oxidative conversion of 1° hydroxyl groups in lignin models and lignin itself, particularly the 1° hydroxyl group on β-O-4 linkage units. Electrochemical analysis of the reactivity of the nitroxyl radicals toward the oxidation of alcohols shows that stable nitroxyl radicals, especially the monocyclic radical TEMPO and its derivatives, are able to convert 1° alcohols to corresponding carboxylic acids efficiently under mild to strongly basic conditions.

Bulk electrolysis experiments were performed in a 10 mL undivided cell, with two blocks of reticulated vitreous carbon (RVC) as a working electrode and a platinum wire as a counter electrode. The electrolysis was conducted in an $H_2O/MeCN$ (70/30) solution with $HCO_3^-/CO_3^{2-}$ electrolyte (pH 9 to 10) provided in the form of sodium hydrogen carbonate ($NaHCO_3$) and sodium carbonate ($Na_2CO_3$). TEMPO and ACT were provided in amount of 5 mol % of added lignin models and 5 wt % of added lignin. The controlled potential electrolysis was conducted at the oxidation potential of the nitroxyl radicals: 0.65 and 0.75 V vs. Ag/AgCl for TEMPO and ACT, respectively. The reactions were terminated by decreasing the current to less than 4% of initial current. Results for oxidation of two lignin models (entries 1 and 2) and aspen lignin isolated according to the method outlined in Example 1 (entry 3) are shown in Table 4.

TABLE 4

Conversion of primary hyroxyl group of lignin models and lignin to carboxylic acid.

| Entry | Substrate | Product | Consumed Charge |
|---|---|---|---|
| 1 | [phenoxyethanol structure] | [phenoxyacetic acid structure] | 4.2 F/138 g |
| 2 | [lignin dimer model with primary OH] | [oxidized dimer with COOH] | 4.3 F/334 g |
| 3 | [lignin-attached dimer structure] | [oxidized lignin-attached structure] | 4.0 F/386 g |

The efficiency of the electrocatalytic system for phenoxyethanol as a monomeric 1° alcohol model (Table 4, entry 1) showed quantitative, complete conversion of alcohol to acid.

The product of this reaction, phenoxyacetic acid, was identified by NMR based on known values for this compound.

Similarly, the dimeric β-O-4 model lignin model bearing both 1° and 2° hydroxyl groups showed complete, selective oxidation of the 1° hydroxyl group (Table 4 entry 2). The product of the oxidation, the β-hydroxy acid shown in Table 4, was identified by NMR: HNMR (400 MHz, CDCl$_3$) δ 6.99-6.92 (m, 3H), 6.83-6.81 (m, 1H), 6.77-6.74 (m, 3H), 5.10 (d, J=4.8 Hz, 1H), 4.62 (d, J=4.8 Hz, 1H), 3.78 (s, 3H), 3.77 (s, 6H); $^{13}$CNMR (100 MHz, CDCl$_3$): δ 173.8, 150.3, 148.9, 148.7, 147.2, 131.2, 124.5, 121.5, 119.6, 119.5, 112.2, 110.8, 110.3, 84.6, 73.8, 55.8, 55.7; MS (ESI) calculated for C17H23NO7 [M+NH$_4$]$^+$ 366.2, found: 366.2. IR: 3277, 2946, 2844, 1730, 1596, 1519, 1504, 1465, 1259, 1179, 1143, 1024, 863, 818, 751. The data from the two model compounds provide the first example of the conversion of a 1° hydroxyl group of a β-aryl ether linkage to a β-hydroxy acid derivative.

The TEMPO-mediated oxidation of the aspen lignin (Table 4, entry 3) showed a consumed charge of 4.0 F/386 g. This consumed charged indicated formation of 0.43 carboxylic acid functional groups per each monomer unit of lignin (phenylpropane or phenylpropanoid unit (ppu)) (the average molecular weight for lignin monomers is the molecular weight of $C_{10}H_{12}O_3$, 180 g/mol). In other words, the coulometric results show formation of 1 carboxylic acid per each 2.3 monomer unit of lignin. Bearing in mind the prevalence of the β-O-4 linkage as the major type of linkage in lignin and the efficiency of the present protocol for oxidatively converting β-O-4 linkages to the corresponding β-hydroxy acids, it can be concluded that the passed current and charges consumed indicate the production of β-hydroxy acid in lignin structure. This is the first example of derivatizing lignin to its carboxylic acid derivative and also the first example of generating a poly β-hydroxy acid from lignin.

Figure 8:
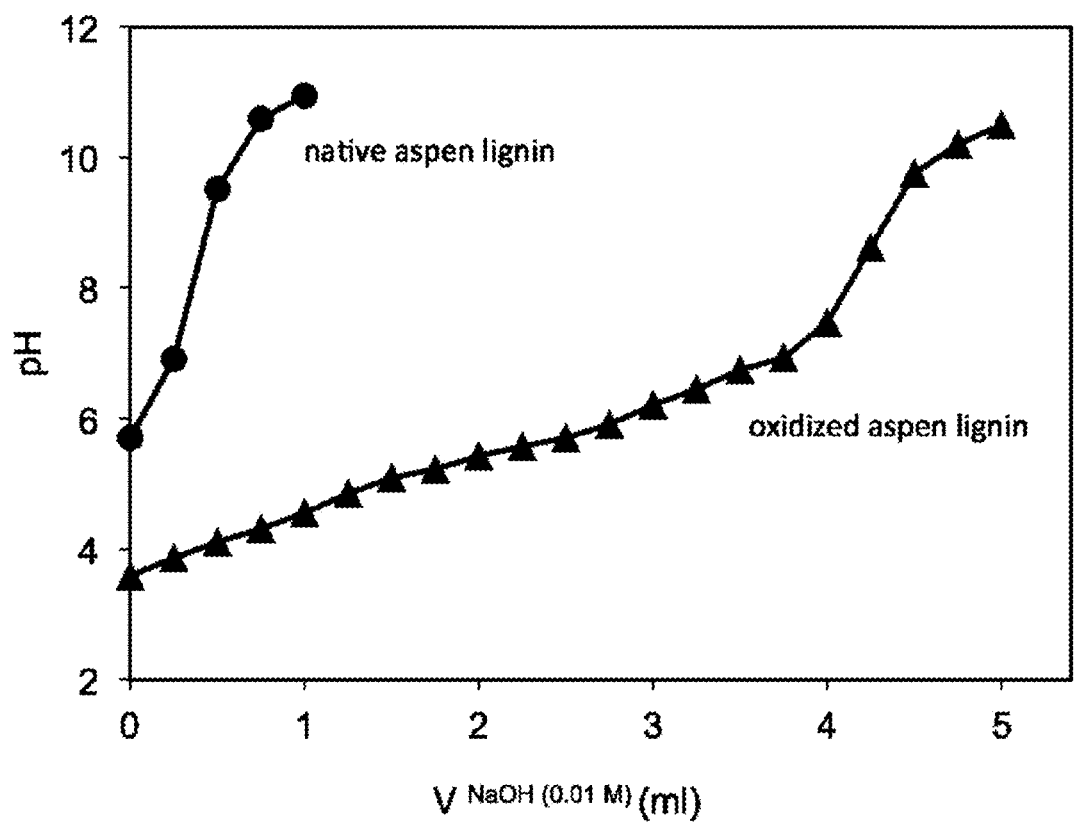
FIG. 8 shows titration curves for unoxidized, native aspen lignin (0.2 g) and TEMPO-mediated oxidized aspen lignin in 10 ml mixture of MeCN/$H_2O$ (35/65) using 0.01 M aqueous NaOH.

Acid base titration of the oxidized lignin (titration of oxidized aspen lignin with sodium hydroxide (NaOH) solution) confirmed the high loading of carboxylic acid (FIG. 8). The loading of carboxylic acid was 2.3 mmol carboxylic acid functional group per each gram of carboxylated lignin (aspen lignin), which is in good agreement with the coulometric results (0.41 carboxylic acid per each monomer unit of lignin).

The presence of carboxylic acid and/or carboxylate functional groups makes lignin more amphiphilic and enhances its water solubility. Both the native and oxidized lignins are water soluble under strongly basic conditions and insoluble under acidic conditions. However, the carboxylated lignin has a solubility of 14 grams per liter (g/l) at pH 9 compared to a solubility of less than 2 g/l for the native lignin at the same pH (at 23° C.). The deprotonated form of the oxidized lignin (after titration with NaOH to pH 9.6) has approximately the same solubility (16 g/l) in water due to the interaction of negatively charged carboxylate group with the water. By contrast, there is no significant change in solubility of the native lignin in water after titration.

Based on the obtained results, it can be concluded that a polymeric β-hydroxy acid was successfully obtained with the nitroxyl radical-mediated electrochemical oxidation methods described herein. The obtained polymeric β-hydroxy acid is a polymeric material with a high loading of carboxylic acid.

Figure 9A:
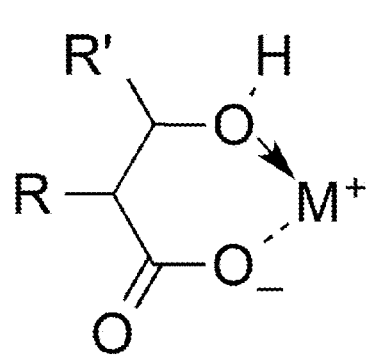
FIGS. 9A and 9B show chelation of monovalent (FIG. 9A) and multivalent (FIG. 9B) metal ions by β-hydroxy acids, such as the poly β-hydroxy acids or salts thereof generated from lignin with the methods of the present invention. R and R' represent remaining portions of oxidized lignin. M represents a metal ion. n represents a number from 1 to 7, inclusive.
Figure 9B:
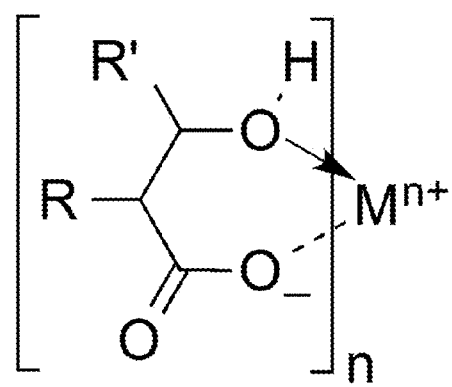

The polycarboxylated compounds described herein have a wide range of utilities. Polyanions or polysalts for example, are particularly effective in chelating monovalent (FIG. 9A) and polyvalent (FIG. 9B) metal ions. The polycarboxylated compounds described herein can therefore be used as polyanions or polysalts for removing toxic metal ions or forming polymeric metal complexes. The polycarboxylated compounds can also be used as polyacids, which have widespread application as dispersants and emulsifiers in pharmaceuticals, cosmetics, and paints (Mark et al. 2009). The polycarboxylated compounds can also be used as a biodegradable polyelectrolyte, which are effective as flocculation agents (e.g., in water treatment); soap, shampoo, and cosmetic additives; and drug delivery agents (Jayant et al. 2002). The polycarboxylated compounds can also be used as a polyelectrolyte in a polyelectrolyte multilayer (PEM) (Séon et al. 2015). Finally, the polycarboxylated compounds can be used to treat various conditions of the skin, e.g., in a manner similar to that described in U.S. Pat. No. 5,889,054; U.S. Pat. No. 6,261,544; and US 2013/0267483.

CITED REFERENCES

Basu Biomass Gasification, Pyrolysis and Torrefaction: Practical Design and Theory.

Boerjan, W., Ralph, J. & Baucher, M. Lignin biosynthesis. Ann. Rev. Plant Biol. 54, 519-549 (2003).

Bruijnincx P. C. A. & Weckhuysen B. M. Biomass Conversion: Lignin up for break-down. Nat. Chem. 6, 1035-1036 (2014).

Bugg, T. D. H., Ahmad, M., Hardiman E. M. & Rahmanpour R. Pathways for degradation of lignin in bacteria and fungi. Nat. Prod. Rep. 28, 1883-1896 (2011)

Constant, S., Robitzer, M., Quignard, F. & Di Renzo, F. Vanillin oligomerization as a model of side reactions in lignin fragmentation. Catal. Today, 189, 123-128 (2012).

Costentin, C., Drouet, S. Robert, M. & J. M. Saveant, Turnover Numbers, Turnover Frequencies, and Overpotential in Molecular Catalysis of Electrochemical Reactions. Cyclic Voltammetry and Preparative-Scale Electrolysis. J. Am. Chem. Soc. 134, 11235-11242 (2012).

Ganguly, B. et al. Hydrolysis and retro-aldol cleavage of ethylthreo-2-(1-adamantyl)-3-hydroxybutyrate: competing reactions. J. Phys. Org. Chem. 24 578-587 (2011).

Hibino, T., Shibata, D., Ito, T., Tsuchiya, D., Higuchi, T., Pollet, B., Lapierre, C. Chemical properties of lignin from *Aralia cordata. Phytochemistry,* 1994, 37, 445.

Jayant, K.; Singh, N. H.; MacDiarmid, A. G. *Handbook of Polyelectrolytes and Their Applications*; Sukant, T. Ed.; American Scientific Publishers, 2002.

Konduri, M. K. R.; Fatehi, P. *ACS Sustainable Chem. Eng.* 2015, 3, 1172-1182

Laurichesse, S.; Averous, L. *Prog. Polym. Sci.,* 2014, 7, 1266-1290.

Lebo, S. E.; Gargulak, J. D.; McNally, T. J. *"Lignin" in Kirk-Othmer Encyclopedia of Chemical Technology. John Wiley & Sons, Inc.* 2001.

Li, C., Zhao, X., Wang, A., Huber, G. W. & Zhang T. Catalytic transformation of lignin for the production of chemicals and fuels. Chem. Rev. 115, 11559-11624 (2015).

Liu, Y.; Li, K. *J. Adhes.* 2006, 82, 593-605.

Mark, J. E. *Polymer Data Handbook; Oxford University Press,* 2009; 252-253.

Nicholson, R. S. and Shain I. Theory of Stationary Electrode Polarography. Single Scan and Cyclic Methods Applied to Reversible, Irreversible, and Kinetic Systems. Anal. Chem., 36, 706-723 (1964).

Parpot, P., Bettencourt, A. P., Carvalho, A. M. & Belgsir, E. M. Biomass conversion: attempted electrooxidation of lignin for vanillin production. J. Appl. Electrochem. 30, 727-731(2000).

Rafiee, M., Miles, K. C. & Stahl S. S. Electrocatalytic Alcohol Oxidation with TEMPO and Bicyclic Nitroxyl Derivatives: Driving Force Trumps Steric Effects, J. Am. Chem. Soc. 137, 14751-14757, (2015)

Rafiee, M., Karimi, B. & Alizadeh, S. Mechanistic Study of the Electrocatalytic Oxidation of Alcohols by TEMPO and NHPI. ChemElectroChem, 1, 455-462 (2014).

Rahimi, A.; Azarpira, A.; Kim, H.; Ralph, J.; Stahl, S. S. Chemoselective Metal-Free Aerobic Alcohol Oxidation in Lignin. J. Am. Chem. Soc. 135, 6415-6418 (2013).

Rahimi, A., Ulbrich, A., Coon, J. J. & Stahl S. S. Formic-acid-induced depolymerization of oxidized lignin to aromatics. Nature 515, 249-252 (2014).

Roberts, V. M.; Fendt, S.; Lemonidou, A.; Li, X.; Lercher, J. A. *Appl. Catal. B* 2010, 95, 71-77.

Rondestvedt, C. S. & Rowley, M. E. The Base-catalyzed Cleavage of β-Hydroxy Acids. J. Am. Chem. Soc., 78, 3804-3811 (1956).

Schmitt, D. Regenbrecht, C., Hartmer, M., Stecker, F. & Waldvogel S. R. Highly selective generation of vanillin by anodic degradation of lignin: a combined approach of electrochemistry and product isolation by adsorption. Beilstein J. Org. Chem. 11, 473-480 (2015).

Séon, Lydie; Lavalle, Philippe; Schaaf, Pierre, and Boulmedais, Fouzia. Polyelectrolyte Multilayers: A Versatile Tool for Preparing Antimicrobial Coatings. *Langmuir,* 2015, 31 (47), pp 12856-12872.

Sheldon, Roger A; and Arends, Isabel W. C. E. Organocatalytic Oxidations Mediated by Nitroxyl Radicals. Advanced Synthesis & Catalysis. Special Issue: Organic Catalysis. Volume 346, Issue 9-10, pages 1051-1071, August 2004.

Shiraishi T, Takano T, Kamitakahara H, Nakatsubo F. Holzforschung, Studies on electro-oxidation of lignin and lignin model compounds. Part 2: N-Hydroxyphthalimide (NHPI)-mediated indirect electro-oxidation of non-phenolic lignin model compounds. Holzforschung, Vol. 66, pp. 311-315, 2012.

Studies on electro-oxidation of lignin and lignin model compounds. Part 2: N-Hydroxyphthalimide (NHPI)-mediated indirect electro-oxidation of non-phenolic lignin model compounds (PDF Download Available). Available from: https://www.researchgate.net/publication/235224749_Studies_on_electro-oxidation_of_lignin_and_lignin_model_compounds_Part_2_N-Hydroxyphthalimide_NHPI-mediated_indirect_electro-oxidation_of_non-phenolic_lignin_model_compounds [accessed May 5, 2016].

Ten, E.; Vermerris, W. *J. Appl. Polym. Sci.* 2015, 132, 42069-42082.

Tuck, C. O., Perez, E., Horvath, I. T. Sheldon, R. A. & Poliakoff, M. Valorization of biomass: deriving more value from waste. Science 337, 695-699 (2012).

Upton, B. M.; Kasko A. M. *Chem. Rev.* 2016, ASAP article.

Wang, W.; Han, G.; Shen, Z.; Sun, R. *Eco-friendly Polymer Nanocomposites Chemistry and Applications*; Thakur, V. K.; Thakur, M. K., Ed.; Springer, New Delhi, 2015.

Zakzeski, J., Bruijnincx, P. C. A., Jongerius, A. L. & Weckhuysen, B. M. The catalytic valorization of lignin for the production of renewable chemicals. Chem. Rev. 110, 3552-3599 (2010).

What is claimed is:

1. A method of oxidizing lignin, the method comprising electrochemically oxidizing lignin in an oxidation process in the presence of a stable nitroxyl radical to form oxidized lignin, the oxidation process being performed at a pH that allows oxidation of primary hydroxyls on at least a portion of β-O-4 phenylpropanoid units comprising both primary and secondary hydroxyls to corresponding carboxylic acids while leaving the secondary hydroxyls on the portion of the β-O-4 phenylpropanoid units unchanged.

2. The method of claim 1, wherein the oxidation process is conducted at a pH of from 7 to 11.

3. The method of claim 1, wherein the oxidation process is conducted in a solvent comprising at least 45% water by volume.

4. The method of claim 1, wherein the oxidation process forms oxidized β-O-4 phenylpropanoid units in the oxidized lignin from corresponding unoxidized β-O-4 phenylpropanoid units in the lignin, wherein at least 60% of the oxidized β-O-4 phenylpropanoid units comprise a carboxylic acid oxidized from a primary hydroxyl in the corresponding unoxidized β-O-4 phenylpropanoid unit and a secondary hydroxyl on the oxidized β-O-4 phenylpropanoid unit that is unchanged from the unoxidized β-O-4 phenylpropanoid unit.

5. The method of claim 1, wherein the oxidation process forms oxidized β-O-4 phenylpropanoid units in the oxidized lignin from corresponding unoxidized β-O-4 phenylpropanoid units in the lignin, wherein at least 50% of the oxidized β-O-4 phenylpropanoid units comprise a secondary hydroxyl that remains unchanged from the unoxidized β-O-4 phenylpropanoid unit.

6. The method of claim 1, wherein the oxidation process forms oxidized β-O-4 phenylpropanoid units in the oxidized lignin from corresponding unoxidized β-O-4 phenylpropanoid units in the lignin, wherein at least 60% of the oxidized β-O-4 phenylpropanoid units remain uncleaved.

7. The method of claim 1, wherein the oxidized lignin comprises from 0.2 to 0.8 carboxylic acid or carboxylate functional groups per ppu.

8. The method of claim 1, wherein the lignin comprises a total phenolic hydroxy content of less than 2.5 mmol/g.

9. The method of claim 1, further comprising deprotonating the oxidized lignin.

10. The method of claim 1, wherein the oxidized lignin comprises polycarboxylated lignin, and wherein the method further comprises isolating the polycarboxylated lignin from non-polycarboxylated components of the oxidized lignin.

11. The method of claim 1, wherein the oxidized lignin has an average molecular weight of from 240 Da to 100,000 Da.

12. The method of claim 1, further comprising separating oxidized lignin species less than 240 Da from oxidized lignin species greater than 240 Da.

13. The method of claim 1, further comprising digesting the oxidized lignin with acid.

14. The method of claim 13, further comprising isolating products having a size less than 240 Da from the acid-digested, oxidized lignin.

* * * * *